United States Patent
Hoang et al.

(10) Patent No.: US 12,207,192 B2
(45) Date of Patent: Jan. 21, 2025

(54) METHODS FOR POWER SAVING SENSING AND RESOURCE ALLOCATION

(71) Applicant: INTERDIGITAL PATENT HOLDINGS, INC., Wilmington, DE (US)

(72) Inventors: Tuong Duc Hoang, Montreal (CA); Martino Freda, Laval (CA); Tao Deng, Roslyn, NY (US); Moon Il Lee, Melville, NY (US); Ghyslain Pelletier, Montreal (CA); Paul Marinier, Brossard (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/654,567

(22) Filed: May 3, 2024

(65) Prior Publication Data
US 2024/0292329 A1    Aug. 29, 2024

Related U.S. Application Data

(63) Continuation of application No. 17/799,294, filed as application No. PCT/US2021/017831 on Feb. 12, 2021.

(Continued)

(51) Int. Cl.
*G08C 17/00*     (2006.01)
*H04W 52/02*    (2009.01)
*H04W 72/542*   (2023.01)

(52) U.S. Cl.
CPC ..... *H04W 52/0225* (2013.01); *H04W 72/542* (2023.01)

(58) Field of Classification Search
CPC ................. H04W 52/0225; H04W 72/542
(Continued)

(56) References Cited

U.S. PATENT DOCUMENTS

2015/0215903 A1    7/2015  Zhao et al.
2019/0306923 A1*  10/2019  Xiong ............ H04J 13/0062
2021/0314917 A1*  10/2021  Lee .................. H04W 72/02

FOREIGN PATENT DOCUMENTS

| EP | 3 468 268 | 4/2019 |
| EP | 3 550 905 | 10/2019 |
| WO | 2020/024175 | 2/2020 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

(Continued)

*Primary Examiner* — Temica M Beamer
(74) *Attorney, Agent, or Firm* — Volpe Koenig

(57) ABSTRACT

A first wireless transmit/receive unit (WTRU) may receive, from a second WTRU, sidelink control information (SCI), including first information indicating if a resource is reserved by the second WTRU, and second information indicating if the second WTRU is a power saving or non-power saving. The first WTRU may measure a reference signal receive power (RSRP) of signals transmitted by the second WTRU. The first WTRU may add a resource to a set of available resources if the first information indicates that the resource is not reserved by the second WTRU. If a resource is reserved, the WTRU may set an RSRP threshold to a first set or second threshold based on a power saving mode of the second WTRU. The first WTRU may add the (Continued)

resource to the set of available resources if the measured RSRP is less than the selected RSRP threshold.

14 Claims, 14 Drawing Sheets

Related U.S. Application Data

(60) Provisional application No. 62/975,489, filed on Feb. 12, 2020, provisional application No. 63/061,707, filed on Aug. 5, 2020, provisional application No. 63/091,662, filed on Oct. 14, 2020, provisional application No. 63/136,530, filed on Jan. 12, 2021.

(58) Field of Classification Search
USPC ........................................................ 370/311
See application file for complete search history.

(56) References Cited

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
Intel Corporation, "Resource Allocation Schemes for NR V2X Communication," 3GPP TSG RAN WG1 Meeting #6, R1-1902484, Athens, Greece (Feb. 25-Mar. 1, 2019).
Intel Corporation, "UE-Autonomous Resource Allocation for NR V2X Sidelink Communication," 3GPP TSG RAN WG1 Meeting #98, R1-1908635, Prague, Czech Republic (Aug. 26-30, 2019).
Interdigital, Inc., "Sidelink Resource allocation for Power saving," 3GPP TSG RAN WG1 #102-e, R1-2006183, e-Meeting (Aug. 17-28, 2020).
Interdigital, Inc., "Sidelink resource allocation for power saving," 3GPP TSG RAN WG1 #103-e, R1-2009121, e-Meeting (Oct. 26-Nov. 13, 2020).
Interdigital, Inc., "Sidelink resource allocation for power saving," 3GPP TSG RAN WG1 #104-e, R1-2100981, e-Meeting (Jan. 25-Feb. 5, 2021).
Third Generation Partnership Project, "Technical Specification Group Services and System Aspects; Study on enhancement of 3GPP Support for 5G V2X Services (Release 16)," 3GPP TR 22.886 V16.2.0 (Dec. 2018).
Third Generation Partnership Project, "Technical Specification Group Services and System Aspects; Study on enhancement of 3GPP Support for 5G V2X Services (Release 15)," 3GPP TR 22.886 V15.1.0 (Mar. 2017).
Third Generation Partnership Project, "Technical Specification Group Services and System Aspects; Enhancement of 3GPP support for V2X scenarios; Stage 1 (Release 15)," 3GPP TS 22.186 V15.2.0 (Sep. 2017).
Third Generation Partnership Project, "Technical Specification Group Services and System Aspects; Enhancement of 3GPP support for V2X scenarios; Stage 1 (Release 16)," 3GPP TS 22.186 V16.2.0 (Jun. 2019).
Third Generation Partnership Project, "Technical Specification Group Services and System Aspects; Proximity-based services (ProSe); Stage 2 (Release 15)," 3GPP TS 23.303 V15.1.0 (Jun. 2018).
Third Generation Partnership Project, "Technical Specification Group Services and System Aspects; Proximity-based services (ProSe); Stage 2 (Release 16)," 3GPP TS 23.303 V16.0.0 (Jul. 2020).
Third Generation Partnership Project, "Technical Specification Group Services and System Aspects; Architecture enhancements for V2X services (Release 16)," 3GPP TS 23.285 V16.4.0 (Sep. 2020).
Third Generation Partnership Project, "Technical Specification Group Services and System Aspects; Architecture enhancements for V2X services (Release 16)," 3GPP TS 23.285 V16.2.0 (Dec. 2019).
Third Generation Partnership Project, "Technical Specification Group Services and System Aspects; System architecture for the 5G System (5GS); Stage 2 (Release 16)," 3GPP TS 23.501 V16.3.0 (Dec. 2019).
Third Generation Partnership Project, "Technical Specification Group Services and System Aspects; System architecture for the 5G System (5GS); Stage 2 (Release 16)," 3GPP TS 23.501 V16.7.0 (Dec. 2020).
Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).
Third Generation Partnership Project, "Technical Specification Group Radio Access Network; Evolved Universal Terrestrial Radio Access (E-UTRA); Physical layer procedures (Release 16)," 3GPP TS 36.213 V16.0.0 (Dec. 2019).
Third Generation Partnership Project, "Technical Specification Group Radio Access Network; Evolved Universal Terrestrial Radio Access (E-UTRA); Physical layer procedures (Release 16)," 3GPP TS 36.213 V16.4.0 (Dec. 2020).
Third Generation Partnership Project, "Technical Specification Group Radio Access Network; Study on evaluation methodology of new Vehicle-to-Everything V2X use cases for LTE and NR; (Release 15)," 3GPP TR 37.885 V1.0.0 (May 2018).
Third Generation Partnership Project, "Technical Specification Group Radio Access Network; Study on evaluation methodology of new Vehicle-to-Everything (V2X) use cases for LTE and NR; (Release 15)," 3GPP TR 37.885 V15.3.0 (Jun. 2019).
Third Generation Partnership Project, "Technical Specification Group Radio Access Network NR Radio Resource Control (RRC) protocol specification (Release 15)," 3GPP TS 38.331 V15.8.0 (Dec. 2019).
Third Generation Partnership Project, "Technical Specification Group Radio Access Network; NR; Radio Resource Control (RRC) protocol specification (Release 15)," 3GPP TS 38.331 V15.12.0 (Dec. 2020).
Third Generation Partnership Project, "Technical Specification Group Radio Access Network; NR; Radio Resource Control (RRC) protocol specification (Release 16)," 3GPP TS 38.331 V16.3.1 (Jan. 2021).
Third Generation Partnership Project, "Technical Specification Group Radio Access Network; NR; Physical layer procedures for data (Release 16)," 3GPP TS 38.214 V16.4.0 (Dec. 2020).
Third Generation Partnership Project, "Technical Specification Group Radio Access Network; NR; Physical layer procedures for data (Release 16)," 3GPP TS 38.214 V16.0.0 (Dec. 2019).

(56) References Cited

OTHER PUBLICATIONS

Third Generation Partnership Project, "Technical Specification Group Radio Access Network; NR; Physical layer measurements (Release 16)," 3GPP TS 38.215 V16.4.0 (Dec. 2020).
Third Generation Partnership Project, "Technical Specification Group Radio Access Network; NR; Physical layer measurements (Release 16)," 3GPP TS 38.215 V16.0.1 (Jan. 2020).
Third Generation Partnership Project, "Technical Specification Group Radio Access Network; NR; NR and NG-RAN Overall Description; Stage 2 (Release 16)," 3GPP TS 38.300 V16.4.0 (Dec. 2020).
Third Generation Partnership Project, "Technical Specification Group Radio Access Network; NR; NR and NG-RAN Overall Description; Stage 2 (Release 16)," 3GPP TS 38.300 V16.0.0 (Dec. 2019).
Third Generation Partnership Project, "Technical Specification Group Radio Access Network; NR; Medium Access Control (MAC) protocol specification (Release 15)," 3GPP TS 38.321 V15.8.0 (Dec. 2019).
Third Generation Partnership Project, "Technical Specification Group Radio Access Network; NR; Medium Access Control (MAC) protocol specification (Release 15)," 3GPP TS 38.321 V15.11.0 (Dec. 2020).
Third Generation Partnership Project, "Technical Specification Group Radio Access Network; NR; Medium Access Control (MAC) protocol specification (Release 16)," 3GPP TS 38.321 V16.3.0 (Dec. 2020).

* cited by examiner

METHODS FOR POWER SAVING SENSING AND RESOURCE ALLOCATION

CROSS-REFERENCE TO RELATED APPLICATIONS

This application is a continuation of U.S. patent application Ser. No. 17/799,294 filed on Aug. 12, 2022 which claims priority to PCT/US2021/017831 filed on Feb. 12, 2021 which claims the benefit of U.S. Provisional Application Nos. 62/975,489 filed on Feb. 12, 2020, U.S. Provisional Application No. 63/061,707 filed on Aug. 5, 2020, U.S. Provisional Application No. 63/091,662 filed on Oct. 14, 2020, and U.S. Provisional Application No. 63/136,530 filed on Jan. 12, 2021, the contents of which are incorporated herein by reference.

BACKGROUND

During vehicle-to-everything (V2X) operation, vehicular communication may include multiple wireless transmit/receive units (WTRUs) (e.g., vehicles with wireless communication capabilities, and/or wireless devices) communicating with each other directly over an air interface. In an in-coverage scenario, WTRUs may receive assistance from the network to start transmitting and receiving V2X messages. In an out-of-coverage scenario, WTRUs may use one or more preconfigured parameters to start transmitting and receiving V2X messages.

V2X communications are supported in, for example, long term evolution (LTE) and new radio (NR), and may include, but are not limited to include, any of the following scenarios: vehicle-to-vehicle (V2V) communications, where vehicular WTRUs may communicate with each other directly; vehicle-to-infrastructure (V21) communications where vehicular WTRUs may communicate with roadside units (RSUs) and/or evolved NodeBs (eNBs); vehicle-to-network (V2N) communications, such that vehicular WTRUs may communicate with the core network; and/or vehicle-to-pedestrian (V2P) communications, where vehicular WTRUs may communicate with WTRUs with special conditions (e.g., low battery capacity or low power).

SUMMARY

Systems and methods may be used for power saving sensing and resource allocation for sidelink (SL) communications. A first wireless transmit/receive unit (WTRU) may receive, from a second WTRU, sidelink control information (SCI). The SCI may include first information indicating, for each resource in a pool of resources, if the resource is reserved by the second WTRU, and second information indicating if the second WTRU is a power saving WTRU or a non-power saving WTRU. The first WTRU may measure a reference signal receive power (RSRP) of signals transmitted by the second WTRU. The first WTRU may perform resource selection by, for each resource in the pool of resources: on a condition that the first information indicates that the resource is not reserved by the second WTRU, adding the resource to a set of available resources. For each resource in the pool of resources, on a condition that the first information indicates that the resource is reserved by the second WTRU: on a condition that the second information indicates that the second WTRU is a power saving WTRU, the WTRU may set a selected RSRP threshold or increments to a first set of RSRP thresholds or increments for determining availability of resources, and on a condition that the second information indicates that the second WTRU is a non-power saving WTRU, the first WTRU may set the selected RSRP threshold or increments to a second set of RSRP thresholds or increments for determining availability of resources. On a condition that the measured RSRP is less than the selected RSRP threshold, the first WTRU may add the resource to the set of available resources. The first WTRU may select resources from the set of available resources to use for transmission.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
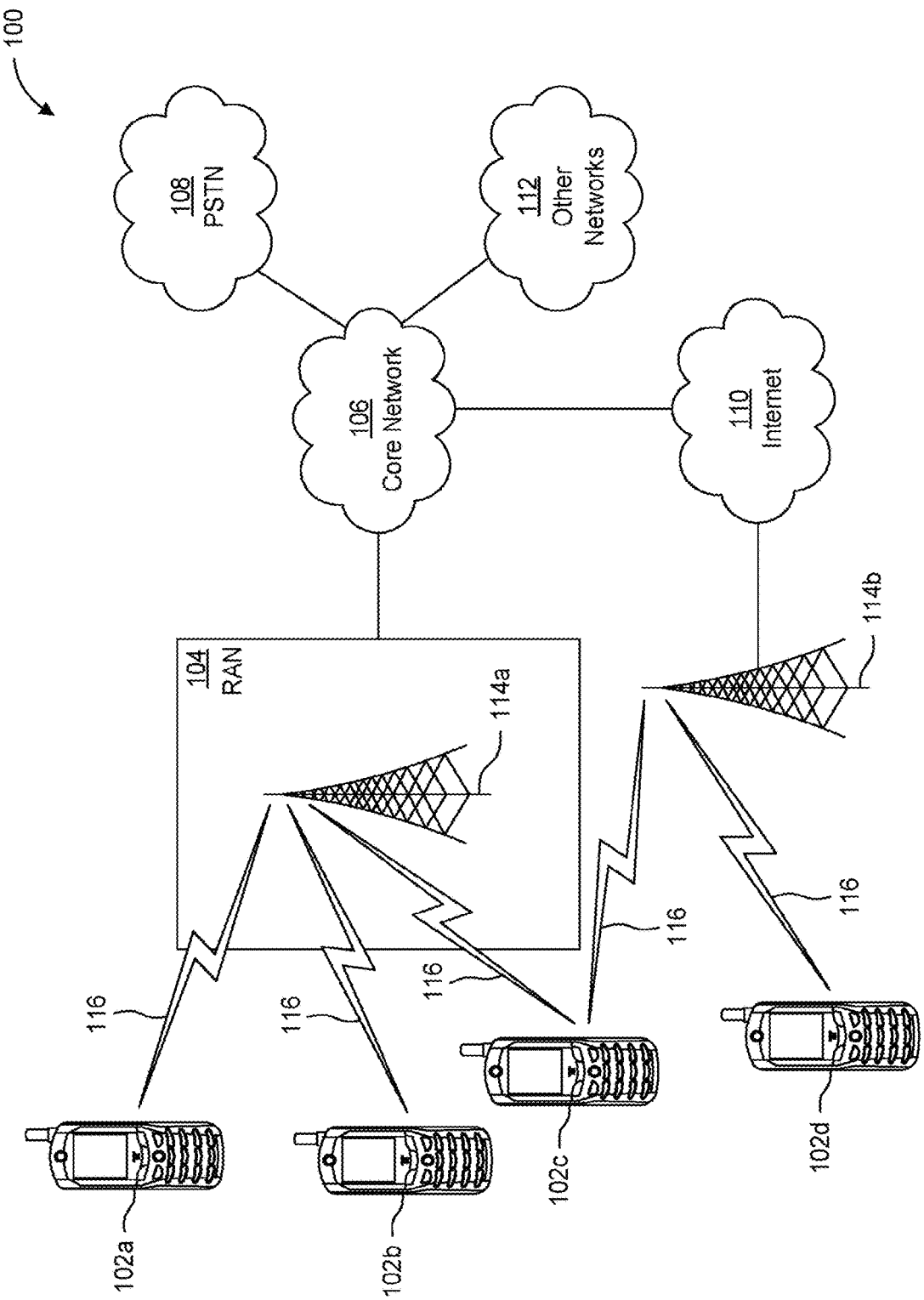
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, which may be vehicles, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a vehicle (e.g., car, self-driving/automated car, bus, train, bike, plane, scooter, roller, etc.), a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an example, the base station 114a may include three transceivers, such as one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an example, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
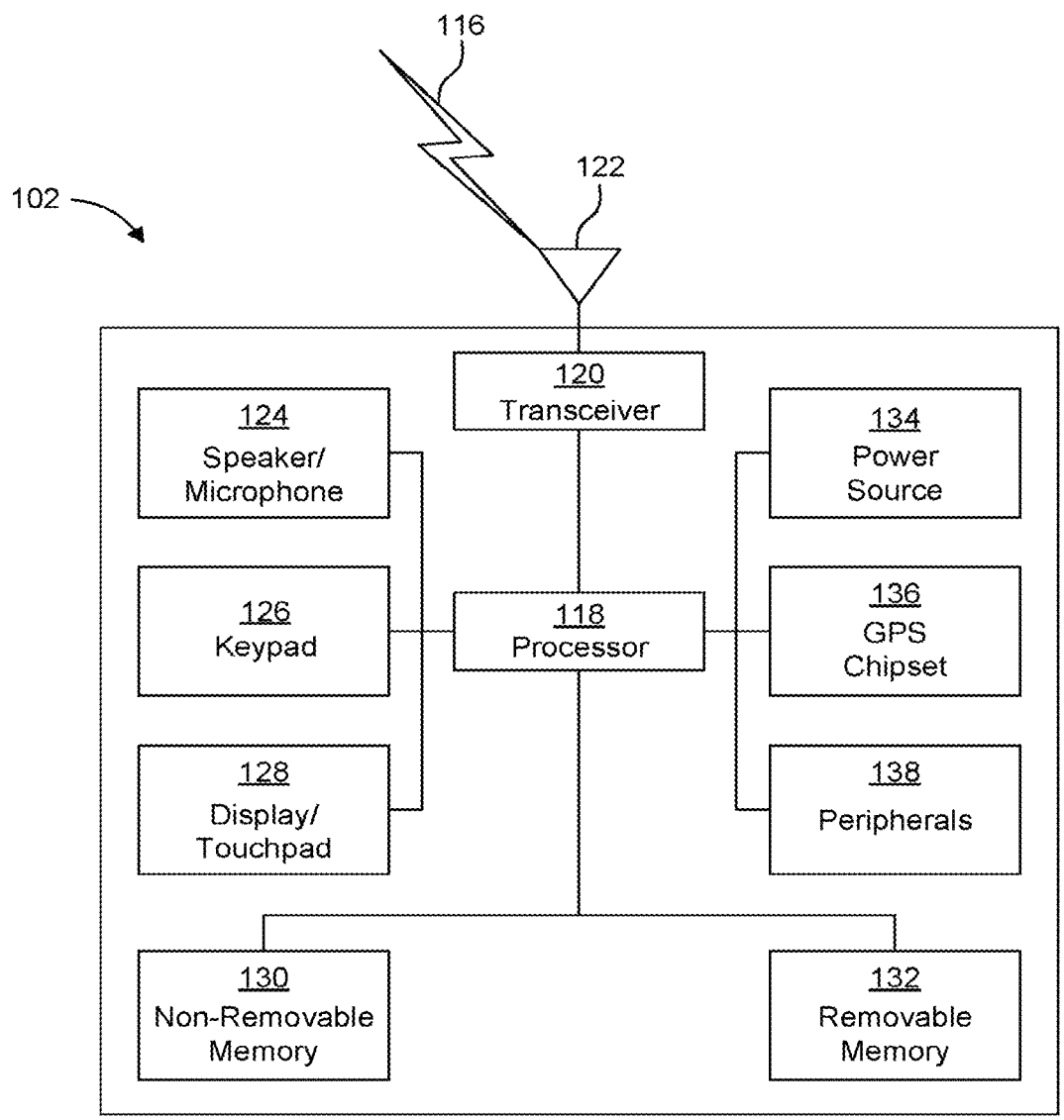
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an example, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
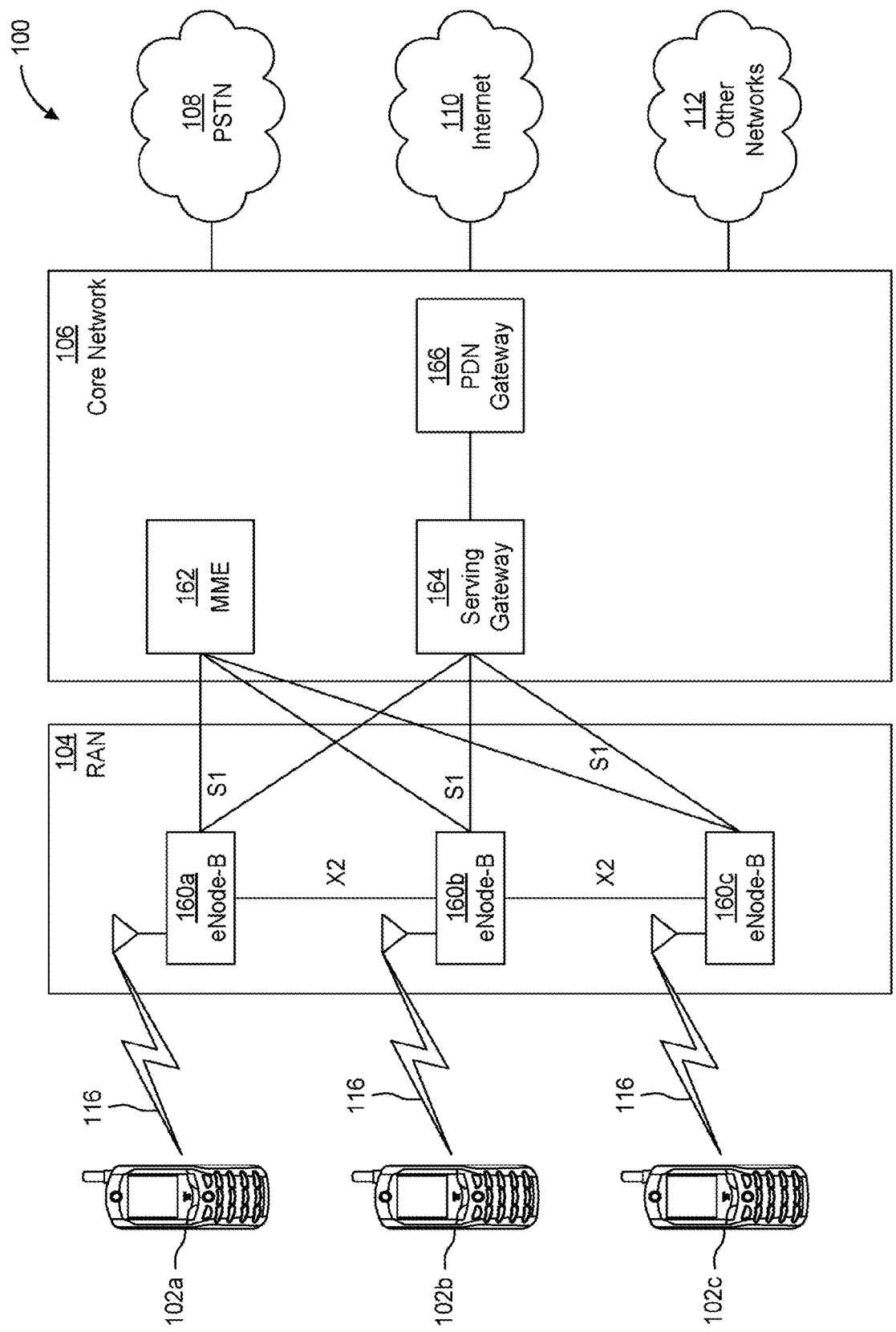
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an example, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHZ channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHZ, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
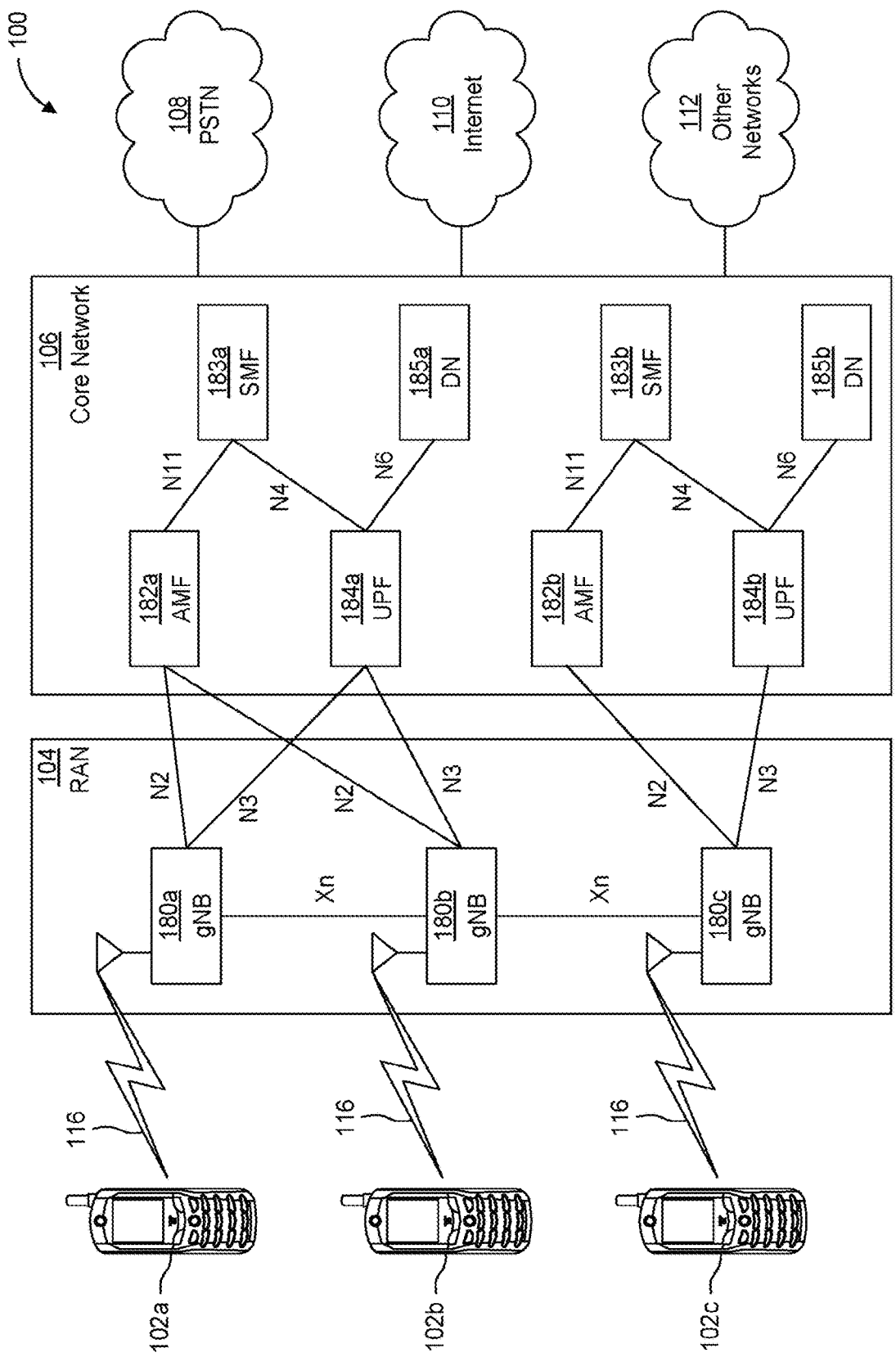
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In an example, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In an example, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

New radio (NR) systems, currently under development by 3GPP, are expected to support several use cases such as enhanced Mobile Broadband (eMBB), ultra-high reliability and low latency communications (URLLC). Support for enhanced V2X (eV2X) communications in NR systems is under development. eV2X in NR may support new services for both safety and non-safety scenarios including, but not limited to, sensor sharing, automated driving, vehicle platooning, and remote driving. Different eV2X services may require different performance requirements and/or time latencies (e.g., a 3 ms latency).

NR V2X may support new use cases including, but not limited to, vehicles platooning, advanced driving, extended sensors, and remote driving. Vehicles platooning may enable vehicles to dynamically form a group travelling together. Two or more vehicles (e.g., all vehicles) in a given platoon may receive periodic data, from a leading vehicle, in order to carry on platoon operations. This data may allow the distance between vehicles (gap distance) to become extremely small, such that the gap distance translated to time can be very low (e.g., sub second). Platooning applications may allow the vehicles in the platoon to be autonomously driven. Advanced driving may enable semi-automated or fully-automated driving. Longer inter-vehicle distance may be assumed. Each vehicle and/or roadside unit (RSU) may share data obtained from its local sensors with vehicles in proximity, allowing vehicles to coordinate their trajectories or maneuvers. In addition, each vehicle may share its driving intention with vehicles in proximity. Such a use group can provide safer traveling, collision avoidance, and improved traffic efficiency.

Extended sensors may enable the exchange of raw or processed data gathered through local sensors or live video data among, for example, vehicles, WTRUs, RSUs, devices of pedestrians, and/or V2X application servers. The vehicles may enhance the perception of their environment beyond what their own sensors can detect and have a more holistic view of a local environment based on the gathered sensor data for a variety of devices. Remote driving may enable a remote driver or a V2X application to operate a remote vehicle (e.g., for passengers who cannot drive themselves) or a remote vehicle located in dangerous environments. Where variation is limited and routes are predictable, such as public transportation, driving based on cloud computing may be used. In an example, access to cloud-based back-end service platform may be used in remove driving.

In the examples described herein, vehicles, WTRUs, RSUs, UEs, and devices of pedestrians may be used interchangeably. For example, a WTRU as used herein may refer to a portable wireless device that is mounted on or integrated into a vehicle (a vehicle that possesses wireless communication capabilities), or a portable wireless device carried by a pedestrian. A WTRU may refer to a pedestrian user equipment (PUE), and may be referred to as a power saving WTRU. A WTRU may refer to a vehicle user equipment (VUE), and may be referred to as a vehicle WTRU. In some examples, a vehicle WTRU (VUE) may be a non-power saving device that is less constrained in available power compared to a power saving WTRU, such as a mobile device carried by a pedestrian (e.g., a PUE).

A QoS model for NR V2X may be described. A QoS over an LTE-V2X air interface, such as the PC5 interface, may be supported with ProSe per-packet priority (PPPP). An application layer may be allowed to mark the packets with the PPPP, which indicates the required QoS level. Certain enhancement may be added such as allowing the derivation of the packet delay budget (PDB) from the PPPP.

Examples of key performance indicators (KPIs) for NR V2X may include payload (e.g., bytes), transmission rate (e.g., message/s), maximum end-to-end latency (e.g., ms), reliability (%), data rate (e.g., Mbps), and/or minimum required communication range (e.g., meters).

The same set of service requirements (or different service requirements) may apply to PC5-based V2X communication and Uu-based V2X communication. Such QoS characteristics may be represented with 5G QoS identifiers (5QIs). In an example, a unified QoS model may be used for PC5 and Uu interfaces such that 5QIs may be used for V2X communication over PC5, and such that the application layer may have a consistent way to indicate QoS requirements regardless of the link used.

In an example, 5G/NR V2X-capable WTRUs (including vehicles) may utilize any one or more of the following types of traffic: broadcast, multicast, and/or unicast. For unicast type of traffic, the same QoS model as that of Uu may be utilized such that each unicast link may be treated as a bearer, and QoS flows may be associated respectively. The QoS characteristics defined in 5QI, and/or the additional parameter of data rate, may apply. In an example, the minimum required communication range may be treated as an additional parameter for PC5 use. Similar consideration may apply to multicast traffic, as it may be treated as a special case of unicast (e.g., with multiple defined receivers for the traffic). For broadcast traffic, there may be no bearer concept. In this case, each message may have different characteristics according to given application requirements. 5QI may be used in a similar manner as that of the PPPP and/or ProSe per-packet reliability (PPPR) (e.g., to be tagged with each packet). 5QI may be able to represent the characteristics needed for PC5 broadcast operation (e.g. latency, priority, and/or reliability). A group of V2X broadcast specific 5QIs (e.g., referred to as VQIs) may be defined for PC5 use.

Figure 2:
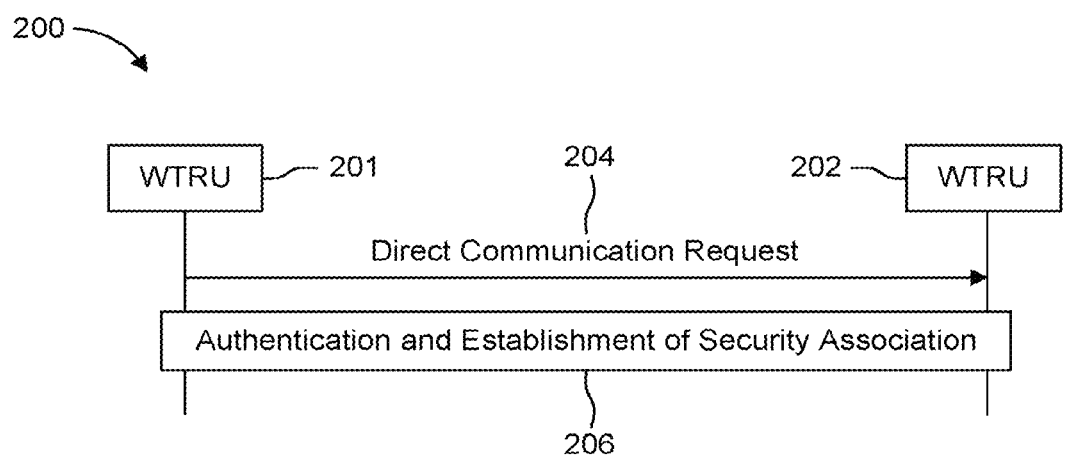
FIG. 2 shows a signaling diagram of an example link establishment procedure.

In an example, PC5 QoS parameters may be negotiated at the establishment of a one-to-one communication procedure, which may be enhanced to support PC5 QoS parameters negotiation between two WTRUs. After the PC5 QoS parameters negotiation procedure, the same QoS may be used in both directions. FIG. 2 shows a signaling diagram of an example link establishment procedure 200, which may be used to establish a secure communication link, such as a layer 2 (L2) link, over the PC5 interface. As shown in FIG. 2, WTRU 201 and WTRU 202 may be engaged in one-to-one communication over a direct air interface such as the PC5 interface, and may negotiate PC5 QoS parameters during the link establishment procedure 200. For example, WTRU 201 may send a direct communication request message 204 to WTRU 202 to trigger a mutual authentication procedure 206 between the WTRUs 201 and 202. The direct communication request message 204 may include (e.g., requested) PC5 QoS parameters. WTRU 202 may initiate the mutual authentication procedure 206. For example, WTRU 202 may send a response message (not shown) to WTRU 201 as part of the mutual authentication procedure 206, and may include in the response message the accepted PC5 QoS parameters in a response message sent back to WTRU 201.

According to an NR V2X traffic model, NR V2X may support, but is not limited to support, any one or more of the following types of traffic: periodic and aperiodic. NR V2X may support additional different types of packet size, packet arrival rate, and/or latency requirements. For example, mode 2 aperiodic traffic may support packet sizes ranging between approximately 10000 and 30000 bytes, average inter-arrival rate of approximately 20 ms, and/or latency requirements of approximately 10 ms. In another example, mode 3 periodic traffic may support packet size ranging between approximately 30000 and 60000 bytes, average inter-arrival rate of approximately 30 ms, and/or latency requirements of approximately 30 ms.

Partial sensing and/or random selection may be used in LTE V2X as power savings mechanisms (e.g., for use by pedestrian WTRUs). With partial sensing, the WTRU may be configured by upper layers with a minimum number of candidate subframes in the resource selection window [T1, T2], where the specific subframes may be selected by WTRU implementation. The WTRU may perform sensing only on subframes, in the sensing window, that are an integer number of reservation periods from the candidate subframes, thus reducing the amount of resources the WTRU needs to perform sensing on in the sensing window. Another implementation for pedestrian WTRUs may be to perform random selection on the resource pool. If a resource pool is configured for random selection, the WTRU may perform selection of resources without considering any sensing results during the sensing procedure.

Discontinuous Reception (DRX) may be used over the NR Uu interface. Connected mode DRX may be specified for power savings in NR Uu for a WTRU in RRC_CONNECTED. DRX may be based on a configured schedule of wake-up times at the WTRU. If the WTRU receives a physical downlink control channel (PDCCH) scheduling during its wakeup time, it may remain awake for a certain time until no further scheduling is received. A WTRU may be configured with parameters including, but not limited to, any of the following example parameters: drx-onDuration Timer: the duration at the beginning of a DRX cycle; drx-SlotOffset: the delay before starting the drx-onDurationTimer; drx-InactivityTimer: the duration after the PDCCH occasion in which a PDCCH indicates a new uplink (UL) or downlink (DL) transmission for the medium access control (MAC) entity; drx-RetransmissionTimerDL (per DL hybrid automatic repeat request (HARQ) process, which may or may not include the broadcast process): the maximum duration until a DL retransmission is received; drx-RetransmissionTimerUL (per UL HARQ process): the maximum duration until a grant for UL retransmission is received; drx-LongCycleStartOffset: the long DRX cycle; drx-StartOffset: the subframe where the long and short DRX cycle starts; drx-ShortCycle: the short DRX cycle; drx-ShortCycleTimer: the duration the WTRU shall follow the Short DRX cycle; drx-HARQ-RTT-TimerDL (per DL HARQ process, which may or may not include the broadcast process): the minimum duration before a DL assignment for HARQ retransmission is expected by the MAC entity; and/or drx-HARQ-RTT-TimerUL (per UL HARQ process): the minimum duration before a UL HARQ retransmission grant is expected by the MAC entity.

A WTRU configured with DRX may determine its active time (e.g., the time when the WTRU actively monitors the PDCCH) such that when a DRX cycle is configured, the active time may include: the duration of a timer (e.g., drx-onDurationTimer, drx-Inactivity Timer, drx-RetransmissionTimerDL, drx-Retransmission TimerUL, and/or ra-ContentionResolutionTimer) is running; the time or duration that a scheduling request is sent on PUCCH and is pending; and/or the time or duration a PDCCH signal or message indicating a new transmission addressed to the C-RNTI of the MAC entity has not been received after successful reception of a random access response message for the preamble not selected by the MAC entity.

Long-term partial sensing and short-term sensing may be implemented in accordance with the subject matter disclosed herein. NR V2X may support both periodic and aperiodic traffic. When semi-persistent resource reservation is enabled, long-term partial sensing (e.g., in LTE V2X) may be used to avoid collision of periodic traffic. However, long-term partial sensing may not detect the reservation of a dynamic resource allocation. Moreover, semi-persistent resource reservation may be enabled/disabled in a resource pool. Hence, in the resource pool with semi-persistent being disabled, long-term partial sensing may not be used.

To reduce resource collision of dynamic resource allocation, a WTRU may need to perform short-term sensing, which can be executed right before transmission of the WTRU. Moreover, to save power, partial sensing may be used in the short-term sensing window. Power saving sensing and resource selection may consider the interaction between long-term partial sensing and short-term partial sensing.

In LTE V2X, a power saving WTRU (also referred to as a power saving user equipment (PUE)) may be expected to use the same resource pool as a device that is not a power saving device, such as a vehicle WTRU (also referred to as a vehicle user equipment, (VUE)) that is not a power saving device. The power saving WTRU may be configured in a large resource pool to perform sensing. Performing sensing in all subchannels configured in the resource pool may result in sensing overhead and power inefficiency. Thus, in an example, the power saving WTRU may selectively choose a set of subchannels form the resource pool to monitor and to perform sensing to save power. In this case, sensing adaptation in the frequency domain may be used.

Techniques for sidelink power savings including power sensing are disclosed herein. In an example, a WTRU may perform long-term partial sensing in one or multiple sensing sub-windows. For example, the WTRU may monitor the semi-persistent reservations of other WTRUs. In a long-term sensing window, the WTRU may partially perform sensing in K slots in each sub-window sensing of X slots, where K≤X. The WTRU may perform resource selection within K slots in the resource selection sub-window of X slots. The time gap between the resource selection sub-window, each sensing sub-window, and/or the number of sub-window sensing occurrences, may be configured or preconfigured.

Figure 3:
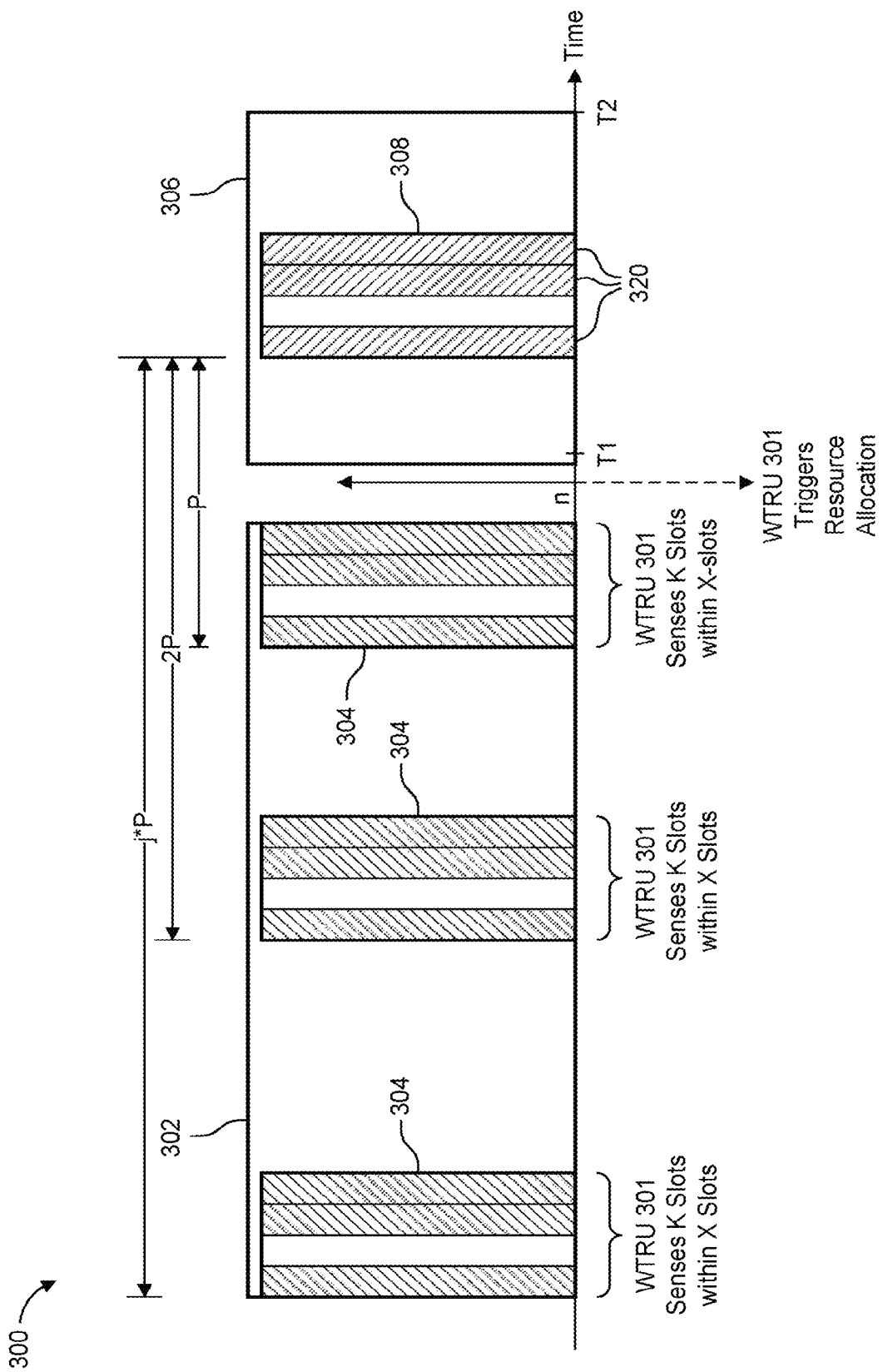
FIG. 3 shows a timing diagram of example sensing windows and sub-windows that may be used in a long-term partial sensing procedure.

FIG. 3 shows a timing diagram of example sensing windows and sub-windows that may be used in a long-term partial sensing procedure 300 by a WTRU 301. During the long-term partial sensing window 302, the WTRU 301 may perform partial sensing of K slots in each sub-window 304 of X slots, for example to monitor and determine the semi-persistent reservations of other WTRUs, prior to selecting resources during a resource selection window 306. The resource selection window 306 starts at time T1, and ends at time T2. The time gap between a first sub-window 304 in the long-term partial sensing window 302 and the resource selection sub-window 308 is j*P, where the value of j and P may (pre-)configured. Other sub-windows 304 may have a time gap to the resource selection sub-window 308 that is a multiple of P (e.g., P, 2P). The WTRU 301 may trigger resource allocation at time n and prior to the start of the resource selection window 306 at time T1, and may select a resource for communication from a set of K selectable slots 320 during resource selection sub-window 308. The WTRU 301 may determine the values of X and/or K based on one or more of the following information: the bandwidth of the resource pool; the number of subchannels on which the WTRU 301 performs sensing in each slot; the QoS or sidelink radio bearer (SLRB)/logical channel (LCH) associated with the pending transport block (TB) or expected TB; the cast type (e.g., unicast, groupcast, or broadcast) of the pending TB; the channel busy ratio (CBR) of the resource pool; the HARQ type of the TB; and/or the power saving mode or state of the WTRU 301. Detailed examples for selecting parameters X and K are described below.

For example, the value of X and/or K may be determined based on the bandwidth of the resource pool and/or the number of subchannel on which the WTRU performs sensing in each slot. For example, the WTRU may determine the value of K as a function of the number of the subchannels used for sensing. The WTRU may select a small value of K if the number of the subchannels used for sensing is large and large value of K if the number of the subchannels used for sensing is small. This approach may be motivated to guarantee that the WTRU is able to select enough available resources for resource selection. In another example, the value of X and/or K may be determined based on QoS or SLRB/LCH associated with the pending TB or expected TB. For example, the WTRU may determine a large value of K and/or X when the priority of the pending TB is high and a small value of K and/or W when the priority of the pending TB is low.

In another example, the value of X and/or K may be determined based on cast type (e.g., unicast, groupcast, or broadcast) of the pending TB. In one example, the WTRU may be configured with different values of K and/or X based on the cast type. Then the WTRU may determine the value of K based on the cast type of the TB. In another example, the WTRU may determine whether to perform sensing or whether to use the sensing results for resource selection or reselection based on the cast type of the TB. For example, the WTRU may perform sensing for broadcast traffic and not to perform sensing for unicast/groupcast traffic. In another example, the value of X and/or K may be determined based on CBR of the resource pool. For example, the WTRU may increase the value of K and/or X when CBR is high and decrease the value of K and/or X when CBR is low.

In another example, the value of X and/or K may be determined based on the HARQ type of a TB. For example, the WTRU may be (pre-)configured with at least two sets of the minimum value of K and X, one set is used for HARQ-disabled transmission and another set is used for HARQ-enabled transmission. The WTRU may then determine the value of K and X based on the HARQ type of a TB. In another example, the value of X and/or K may be determined based on one or more power saving mode/state of the WTRU. For example, a WTRU may be (pre)configured with a set of power saving mode/state and each power saving mode/state may be associated with a partial sensing configuration. The partial sensing configuration may include a minimum amount of resources (e.g., minimum number of slots, the sub-channels for sensing) to perform sensing before performing transmission. The WTRU may thus determine the number of sensing resource based on the current power saving state.

Figure 4:
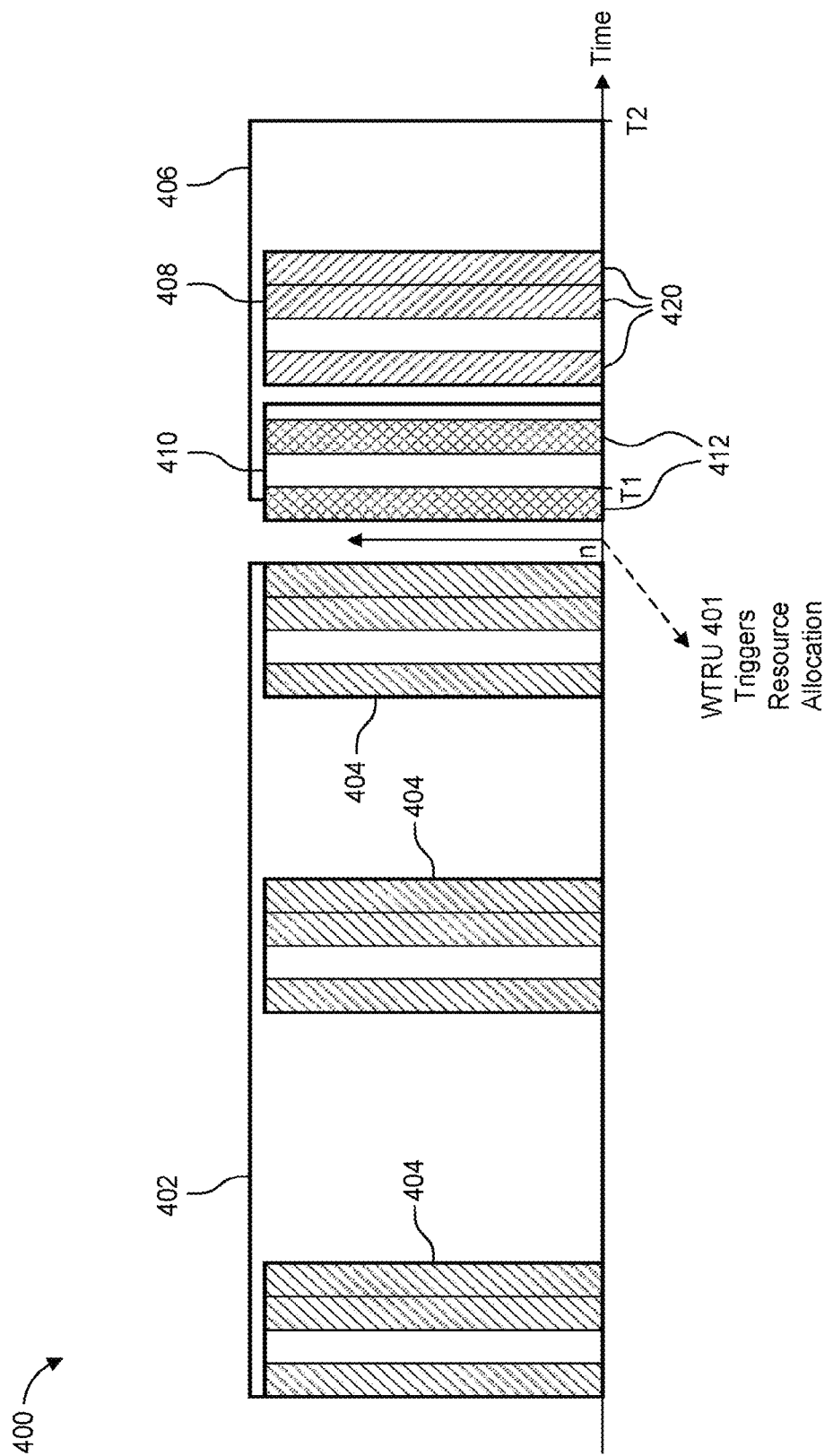
FIG. 4 shows a timing diagram of example sensing windows and sub-windows that may be used in a short-term partial sensing procedure.

In an example, the WTRU may perform short-term partial sensing. The WTRU performing short-term partial sensing may enable the WTRU to detect dynamic reservations of a TB. For example, the WTRU may perform short-term partial sensing after the packet arrives or after the WTRU triggers resource selection, or before the WTRU triggers resource selection. FIG. 4 shows a timing diagram of example sensing windows and sub-windows that may be used in a short-term partial sensing procedure 400 by a WTRU 401. In addition to long-term partial sensing window 402 and sensing sub-windows 404, as shown in the example of FIG. 4, the WTRU 401 may be able to perform short-term partial sensing during the short-term partial sensing window 410 using the set (subset) of sensed slots 412. The short-term partial sensing window 410 may start after the WTRU 401 triggers resource allocation at time n. The short-term partial sensing window 410 may end before the start of resource selection sub-window 408 (which may include a set of K selectable slots 420), and may end after as shown the start time T1 of the resource selection window 406 ((or, not shown, before the start time T1).

Figure 5:
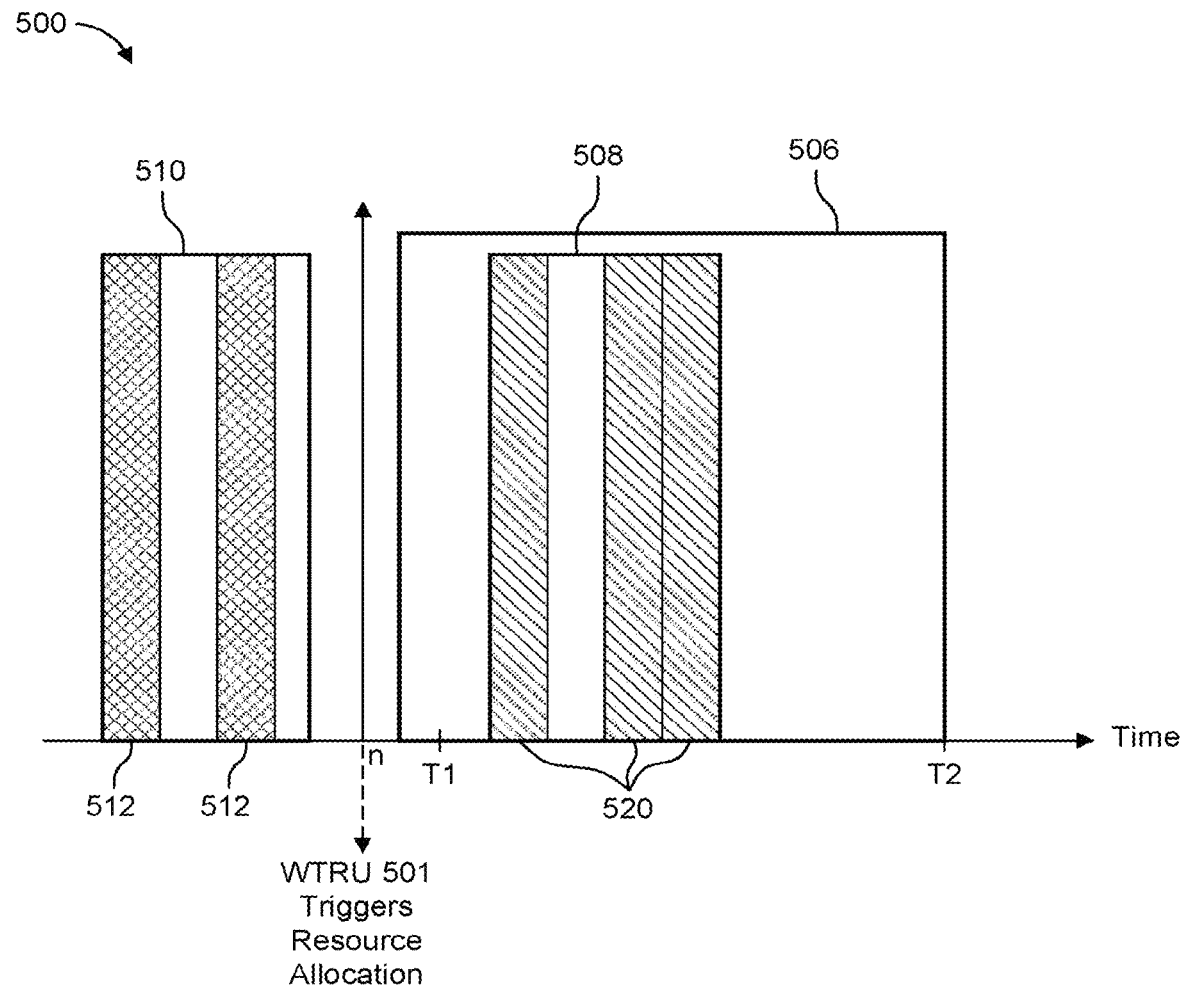
FIG. 5 shows a timing diagram of another example of sensing windows and sub-windows that may be used in a short-term partial sensing procedure.

FIG. 5 shows a timing diagram of another example of sensing windows and sub-windows that may be used in a short-term partial sensing procedure 500 by a WTRU 501. Although not shown, a long-term partial sensing window and sensing sub-windows may be included in FIG. 5. As shown in the example of FIG. 5, the WTRU 501 may be able to perform short-term partial sensing during the short-term partial sensing window 510 using the set (subset) of sensed slots 512. The short-term partial sensing window 510 may occur before the WTRU 501 triggers resource allocation at time n. The short-term partial sensing window 510 may end before the start of the resource selection window 506 and before the start of the resource selection sub-window 508 (which may include a set of K selectable slots 520). In an example, the WTRU 501 may perform short-term partial sensing after it triggers resource selection for aperiodic traffic and before it triggers resource selection for periodic traffic. In the example cases shown in FIGS. 4 and 5, the short-term partial sensing window may be determined based on one or more of the following criteria: time gaps between the packet arrival time and the first selectable slot in the resource selection sub-window; the QoS or SLRB/LCH of the pending TB or expected TB; and/or whether the WTRU performs long-term partial sensing or not.

In an example, short-term partial sensing window may be determined based on the time gap between the packet arrival time and the first selectable slot in the resource selection sub-window. For example, if the time gap is smaller than a threshold W, the short-term partial sensing window is smaller than W. If the time gap is larger than a threshold, the short-term partial sensing window may be equal to W. The value of W may be fixed or (pre-)configured by the network.

In an example, short-term partial sensing window may be determined based on the QoS or SLRB/LCH of the pending TB or expected TB. In an example, the WTRU may be configured with multiple minimum short-term partial sensing windows in which each window may be associated with one or multiple priority levels of a TB. The WTRU may determine the short-term partial sensing window size based on the QoS of the pending TB. For example, the WTRU may use a small short-term partial sensing window for low priority TBs and a large short-term partial sensing window for high priority TBs.

In an example, the WTRU may perform short-term partial sensing in the set of slots between the resource selection triggering and the first candidate resource selection slot if the WTRU performs long-term partial sensing. In another example, if the WTRU does not perform long-term partial sensing, the WTRU may perform short-term partial sensing according to a (pre-)configured sensing window. The (pre-)configured short-term partial sensing window may be associated with the QoS of the TB or may be fixed as X slots (e.g., 32 slots).

In an example, a WTRU may determine a set of slots in the short-term partial sensing window to perform sensing. The set of slots may be determined based on one or more of criteria: configuration/pre-configuration; QoS or SLRB/LCH associated with the TB; CBR of the resource pool; whether resource (re-)evaluation of a TB is enabled or disabled; HARQ type of the TB (e.g., HARQ enabled and HARQ disabled TB); cast type of the TB (e.g., broadcast, unicast, or groupcast); the number of candidate slots and/or the number of candidate resources in a period; DRX status of the WTRU; whether the WTRU performs resource selection for initial selection, (re-)evaluation for a selected resource, or (re-)evaluation for a reserved resource; and/or whether semi-persistent is enabled/disabled in the resource pool.

In an example, the set of slots may be determined based on configuration/pre-configuration. For example, the WTRU may configure/pre-configure a set of time gaps between each selectable slot and the slots to sense in the resource selection sub-window. In an example, the set of slots may be determined based on the QoS or SLRB/LCH associated with the TB. For example, the WTRU may configure/pre-configure the minimum number of the sensed slots in the short-term partial sensing window. Then WTRU may then select the set of slots to perform sensing to satisfy that the number of sensed slots is greater than the configured/pre-configured threshold. The WTRU may select the set of slots at the beginning/end of short-term sensing window or the set of slots may be randomly selected.

In an example, the set of slots may be determined based on the CBR of the resource pool. In one example, the WTRU may perform short-term partial sensing if the CBR of the resource pool is greater than a threshold and may not perform short-term partial sensing if the CBR of the resource pool is smaller than a threshold. In another example, the WTRU may determine the short-term partial sensing window based on the CBR of the resource pool. For example, the WTRU may configure/pre-configure the short-term sensing window for each CBR range. The WTRU may then determine the actual short-term partial sensing window based on the measured CBR of the resource pool.

In an example, the set of slots may be determined based on whether resource (re-)evaluation of a TB is enabled/disabled. For example, the WTRU may determine the short-term sensing window size based on whether the resource (re-)evaluation a TB is enabled/disabled. For example, the WTRU may be (pre-) configured one short-term sensing window when resource (re-)evaluation is enabled, and it may be (pre-) configured another short-term sensing window when resource (re-)evaluation is disabled. The short-term sensing window may be further determined based on the QoS of the TB and/or CBR of the resource pool. The WTRU may then determine the short-term sensing window based on whether resource (re-)evaluation is enabled/disabled.

In an example, the set of slots may be determined based on HARQ type of the TB (e.g., HARQ enabled and HARQ disabled TB). In an example, the set of slots may be determined based on cast type of the TB (e.g., broadcast, unicast, or groupcast). In an example, the set of slots may be determined based on the number of candidate slots and/or the number of candidate resource in a period. For example, the WTRU may determine the short-term sensing window based on the number of candidate slots in a period (e.g., the period from packet arrival time to the PDB). For example, if the number of candidate resources is smaller than the required minimum number of candidate slots, the WTRU may not perform short-term sensing. If the number of candidate slots is greater than a minimum required candidate resource, the WTRU may initiate short-term sensing upon the arrival of the packet until the number of candidate resources is equal to the minimum required one and/or the short-term sensing window is greater than or equal to the minimum required short-term sensing window.

In an example, the set of slots may be determined based on DRX status of the WTRU. For example, the DRX status of the WTRU may include any one or more of the following: whether DRX is configured; and/or whether the WTRU is in on duration or off duration. In an example, the set of slots may be determined based on the power saving mode of the WTRU. In an example, the set of slots may be determined based on whether the WTRU performs resource selection for initial selection, (re-)evaluation for a selected resource, and/or (re-) evaluation for a reserved resource. For example, the WTRU may be (pre-) configured with three minimum short-term sensing windows for initial resource selection, (re-)evaluation for a selected resource, and/or (re-)evaluation for a reserved resource. The WTRU may determine the short-term sensing for initial selection, (re-) evaluation for a selected resource, and/or (re-)evaluation for a reserved resource, accordingly. In an example, the set of slots may be determined based on whether semi-persistent is enabled/disabled in the resource pool.

In an example, a WTRU may determine to trigger sensing (e.g., long-term partial sensing and/or short-term partial sensing) based on one or more of the following criteria: when/if a packet arrives at the access stratum (AS) layer; the value of a counter associated with resource selection/re-selection reaching a threshold; the arrival of p periodic traffic; and/or the WTRU determining to perform resource re-evaluation for resources reserved semi-persistently.

In an example, a WTRU may trigger short-term partial sensing when a packet arrives at the AS layer and the WTRU needs to perform resource selection/re-selection for the packet. In another approach, a WTRU may only trigger short-term partial sensing W slots before the resource selection window or resource selection sub-window. The value of W may be determined based on one or more pre-configuration by the network (e.g., the WTRU may configured/pre-configured the minimum duration of the short-term partial sensing before the resource reselection window), the QoS of the pending or expected TB, and/or CBR of the resource pool.

In an example, a WTRU may trigger sensing when a resource selection/re-selection counter is smaller than a threshold. For example, the WTRU may maintain a resource selection/re-selection counter for one or multiple sidelink processes. If the counter reaches zero, the WTRU may perform resource selection/re-selection for that sidelink process. The WTRU may then determine to perform long-term partial sensing when the counter is smaller than a threshold. This approach may be motivated to guarantee that the WTRU has enough sensing results when it needs to perform resource selection/re-selection.

In an example, a WTRU may trigger long-term partial sensing in response to the arrival of periodic traffic. The WTRU may use random resource selection and/or short-term sensing-based resource selection for the first N periods of periodic traffic. The value of N may be based on the periodicity of the periodic traffic and/or the (pre-)configured long-term sensing periods. The WTRU may then use long-term partial sensing and/or short-term partial sensing to perform resource selection for the following period when the long-term partial sensing result is available.

In an example, the WTRU may trigger long-term partial sensing for resource re-evaluation of the resources reserved semi-persistently. For example, the WTRU may perform long-term partial sensing to determine the availability of semi-persistently reserved resources. Before the resource re-evaluation event, the WTRU may determine to perform long-term partial sensing to collect the sensing result for the resource re-evaluation event. In an example, a WTRU may perform either long-term partial sensing or short-term partial sensing or both sensing procedures based on one or more of configuration/pre-configuration (e.g., the WTRU may perform short-term partial sensing only when the semi-persistent reservation is disabled in the resource pool), the QoS of the pending TB or expected TB, the type of traffic (e.g., unicast/groupcast/broadcast, or periodic/aperiodic traffic), the HARQ retransmission type for the TB, and/or whether the WTRU performs semi-persistent reservation for the TB or not. In an example, the WTRU may perform either long-term partial sensing or short-term partial sensing or both sensing procedures based on the HARQ retransmission type for the TB (e.g., HARQ feedback-based retransmission, blind retransmission, or a mixture of HARQ feedback-based retransmission and blind retransmission). For example, the WTRU may perform short-term partial sensing only for resource selection of the TB with HARQ-feedback-based retransmission and it may perform both short-term partial and long-term partial sensing for resource selection of the TB with blind retransmission.

In an example, a WTRU may perform only short-term partial sensing for resource allocation without semi-persistent reservation (e.g., for resource allocation of aperiodic traffic or for resource allocation of periodic traffic in the resource pool with semi-persistent reservation being disabled). In an example, a WTRU may perform short-term partial sensing only if the priority of the TB is higher than a threshold. This implementation may allow the WTRU to reduce collision to high priority TB. In another example, the WTRU may perform short-term partial sensing only if the priority of the TB is smaller than a threshold; otherwise, it may perform both short-term and long-term partial sensing.

In an example, a WTRU may perform long-term partial sensing only when the WTRU performs resource selection with a semi persistent reservation. In another example, the WTRU may perform long-term partial sensing only when the priority of the pending TB or the expected TB is smaller/larger than a threshold.

In an example, a WTRU may perform both long-term partial sensing and short-term partial sensing when it performs resource selection with a semi-persistent reservation. In another example, the WTRU may perform both long-term partial sensing and short-term partial sensing when the priority of the TB is greater than a threshold. This implementation may reduce collision probability of the high priority TBs. In another example, the WTRU may perform both long-term and short-term partial sensing when the size of the TB is larger than a threshold or the number of subchannels used to transmit the TB is smaller than a threshold.

In an example, a WTRU may determine the set of slots and/or subchannels to perform sensing and/or resource allocation based on one or more of the configuration/pre-configuration, QoS or SLRB/LCH associated with the pending TB or expected TB, the size of the pending TB or the expected TB, the size of the sensing window and/or the number of sensed slots in a sensing window, the CBR of the resource pool, Channel occupancy (CR) of the WTRU, location of the WTRU, random selection, the sensing results, resource evaluation results, the set of reserved resources, transmission activity of the WTRU, and/or the sensing type (for example, short-term sensing or long-term sensing).

A WTRU may determine the set of subchannels and/or slots for sensing based on configuration/pre-configuration. For example, the WTRU may configure/pre-configure a minimum number of subchannels and/or slots to perform sensing and/or resource allocation. The WTRU may select the number of subchannels and/or slots for sensing and/or resource selection to be greater or equal than the minimum configured value(s).

A WTRU may be configured with different minimum sensing bandwidth and/or different number sensing slots based on the priority or SLRB/LCH associated with the pending TB or expected TB. The WTRU may then determine the sensing bandwidth and/or number of sensing slots based on the priority of the pending TB or the expected TB.

A WTRU may determine the sensing bandwidth based on the size of the pending or expected TB. For example, the WTRU may perform sensing in one sensing bandwidth if the size of the pending or expected TB is greater than a threshold and it may determine to perform sensing in another sensing bandwidth if the size of the pending or expected TB is greater than a threshold. The threshold may be determined by the WTRU or it may be configured/pre-configured by the network per resource pool.

For example, a WTRU may be configured/pre-configured with a minimum number of resources to sense in the sensing window. The WTRU may determine the number of slots and the number of subchannels in each sensed slot to perform sensing to guarantee that the total amount of resources to sense is greater than the configured/pre-configured value. The WTRU may then determine the number of subchannels to perform sensing based on the number of sensed slots in the sensing window.

A WTRU may determine the set of subchannels and/or slots for sensing based on CBR of the resource pool and/or CR of the WTRU. For example, as shown in Table 1 and Table 2, the WTRU may configure/pre-configure the minimum sensing bandwidths and/or the minimum number of slots to perform sensing based on the CBR of the resource pool and/or CR of the WTRU. The WTRU may then determine the sensing bandwidth and/or the minimum number of slots to perform sensing based on the measured CBR of the resource pool and/or the CR of the WTRU.

TABLE 1

Minimum sensing bandwidth configuration as a function of CBR

| CBR | Minimum sensing bandwidth and/or Minimum number of sensing slots |
|---|---|
| CBR ≤ CBR1 | BW1, K1 |
| CBR1 < CBR ≤ CBR2 | BW2, K2 |
| ... | |
| CBRn − 1 < CBR ≤ CBRn | BWn, Kn |

TABLE 2

Minimum sensing bandwidth configuration as a function of CR

| CR | Minimum sensing bandwidth and/or Minimum number of sensing slots |
|---|---|
| CR ≤ CR1 | BW1, K1 |
| CR1 < CR ≤ CR2 | BW2, K2 |
| ... | |
| CRn − 1 < CR ≤ CRn | BWn, Kn |

A WTRU may determine the set of subchannels and/or slots for sensing based on the WTRU's location. For example, the WTRU may be configured a mapping between the WTRU's location (e.g., zone) and the set of sensing subchannels. The WTRU may then determine the set of sensing subchannels based on the WTRU's location. In another example, a WTRU may randomly select a set of subchannels to perform sensing and resource allocation. This implementation may allow the transmission resources of all WTRU to be equally distributed in a large resource pool.

A WTRU may determine the set of subchannels and/or slots for sensing based on its sensing results. In one example, the WTRU may exclude any slot in the set of monitoring/sensing slots if the amount of reserved resources in that slot is greater than a threshold. In another example, the WTRU may exclude a set of subchannels from the set of monitoring subchannels in all sensing slots or in a subset of sensing slot if the amount of reserved resources in that subchannels is higher than a threshold. The WTRU may stop monitoring a set of subchannels by not decoding sidelink control information (SCI) in these subchannels and/or not using the sensing results obtained from these subchannels to use in the resource re-evaluation procedure. These implementations may help the WTRU save power since the WTRU may not need to monitor/sense in the slots, which are already reserved by other WTRUs. The WTRU may determine the duration to exclude the occupied slot from the set of sensing slots based on one or more of a configured/preconfigured setting, a random selection, QoS or SLRB/LCH associated with of a pending or expected TB and/or QoS of the TB associated with the occupied slot, and/or the Channel Busy Ratio (CBR) of the resource pool.

In an example, a WTRU may determine the duration to exclude the occupied slot from the set of sensing slots based on a configured/preconfigured setting. For example, the WTRU may be configured a fixed duration/period exclude the occupied slot from the set of monitoring/sensing slots. In an example, a WTRU may determine the duration to exclude the occupied slot from the set of sensing slots based on random selection. For example, the WTRU may randomly select a time gap (e.g., number of slots) to exclude the occupied slots from the set of monitoring slots. The time gap may be randomly selected within a range, which may be configured/pre-configured by the network. In an example, a WTRU may determine the duration to exclude the occupied slot from the set of sensing slots based on QoS or SLRB/LCH associated with of a pending or expected TB and/or QoS of the TB associated with the occupied slot. For example, the WTRU may exclude a slot from monitoring/sensing for a long duration for high priority TB and for a short duration for low priority TB. In an example, a WTRU may determine the duration to exclude the occupied slot from the set of sensing slots based on CBR of the resource pool. For example, the WTRU may stop monitoring an occupied slot for long time if CBR is low and stop monitoring the occupied slot for short time if CBR of the resource pool is high.

A WTRU may adapt a set of sensing resources based on the resource evaluation result. For example, the WTRU may adapt the set of slots and/or the set of subchannels to perform sensing based on the results of one or more of the resource evaluation procedures described herein. For example, the WTRU may increase the amount of the sensing resource by increasing the number of sensing slots or the number of sensing subchannels if one or more of the following example conditions is satisfied: the amount of selectable resources is less than a certain threshold after the resource evaluation procedure; and/or the number of times the RSRP threshold is increased is more than a (pre-)configured time. In another example, the WTRU may decrease the amount of the sensing resource if one or more of the following example conditions is satisfied: the WTRU reports larger than a certain amount of resource after the resource evaluation procedure; and/or the number of times the RSRP threshold is increased is less than a (pre-)configured time.

A WTRU may determine the set of slots and/or subchannels to perform sensing based on the set of reserved resources. For example, the WTRU may be configured/pre-configured to perform resource evaluation/re-evaluation for the reserved resources and/or the time gap(s) between the reserved resource and the sensing slot to determine a potential collision between the WTRU's reserved resource and other WTRU's reserved resource.

Figure 6:
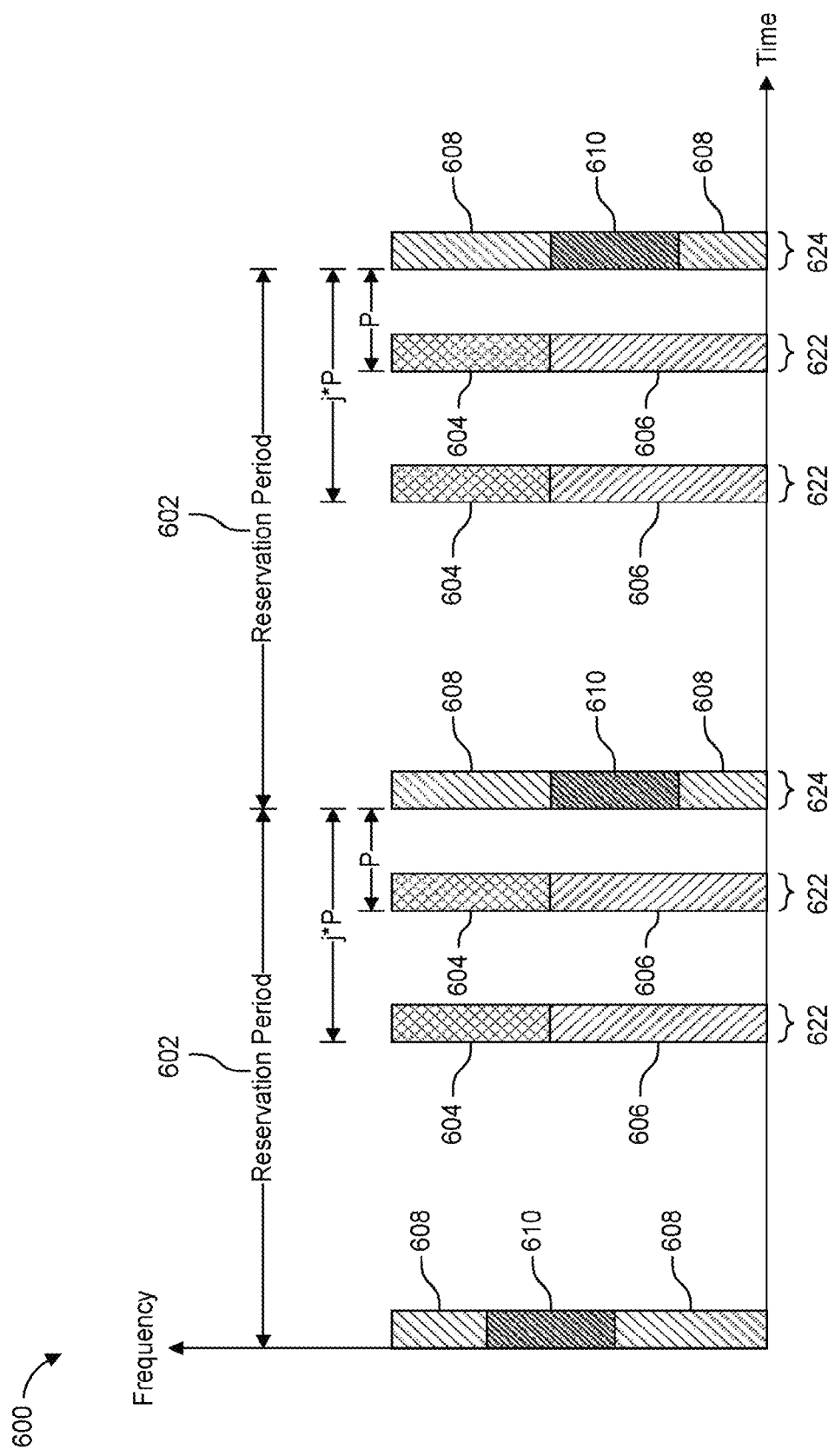
FIG. 6 shows a timing diagram of an example procedure for a WTRU to determine the set of resources to perform sensing based on the set of reserved resources.

FIG. 6 shows a timing diagram of an example procedure 600 for a WTRU 601 to determine the set of resources to perform sensing based on the set of reserved resources. In the example of FIG. 6, the WTRU 601 may reserve resource(s) 610 in slot 624 for transmission in each reservation period 602. The WTRU 601 may use the resource(s) 606, which includes subchannel 610, in the sensing slot(s) 622 to sense/monitor the reservation of other WTRU(s) 603. The WTRU 601 may perform monitoring/sensing in the subchannels 606 of the sensing resource 622, in which other WTRUs 603 may reserve resource for transmission in slot 624 colliding with subchannel 610. The set of slots 622 to perform sensing may have time gaps of j*P slots before the reserved slots 624 that are reserved for transmissions by the WTRU 601.

According to another example, a WTRU may skip monitoring one or multiple sensing sub-windows to save power. The WTRU may determine whether to skip monitoring or multiple sensing sub-windows based on the QoS of the TB and/or CBR of the resource pool. For example, the WTRU may be configured/pre-configured for multiple sensing sub-windows to monitor. The WTRU may skip monitoring one or multiple sensing sub-window if the priority of the TB is smaller than a threshold and/or CBR of the resource pool is smaller than a threshold. If the priority of the TB is greater than a threshold and/or CBR of the resource is larger than a threshold, the WTRU may not skip any configured monitoring sub-window.

In an example, dynamic adaption of resources for sensing may be a function of transmission activity. A WTRU may dynamically adapt the resources on which sensing is performed as a function of the scheduling activity and/or resource usage (e.g., channel occupancy of the WTRU). The WTRU may perform sensing on a first set of resources or a first resource pool when a DRX timer T is running, start or restart the DRX timer when the WTRU determines that there is transmission activity (e.g., based on sensing on a resource associated to the resource pool that the WTRU is currently using), and perform sensing on the second set of resources or resource pool upon expiration of the DRX timer. The WTRU may start or restart the DRX timer if the WTRU determines that the transmission is for a session of the WTRU's configuration (e.g. interested L2 identities (IDs)). The WTRU may make such determination using transmissions in only one of the resource pools if the other resource pool is used only for the purpose of restarting the timer (e.g., if transmissions in one of the resource pools does not enable the WTRU to determine whether or not the transmission is for a session of the WTRU's configuration such as a wake-up signal). The WTRU may additionally use the first resource for sensing according to a fixed (e.g., configured) period.

The transitions between the resources on which sensing is performed may be similar to the transitions between resource pools as described herein. The WTRU may determine that there is scheduling activity based on sensing only, based on sensing and decoding of control information, based on decoding of control information only or based on a transmission thereof, and/or if WTRU determines that the transmission is associated with a session of the WTRU's configuration.

A WTRU may determine the number of candidate slots for sensing based on transmission activity. In an example, a WTRU may determine the number of candidate slots for sensing based on the transmission activity. For example, the WTRU may use the first number of candidate slots K1 for the WTRU's sensing procedure in the absence of any transmissions/receptions associated with the V2X services (e.g. L2 IDs) configured at the WTRU. Upon reception/transmission associated with such V2X service, the WTRU may then use the second number of candidate slots K2, for a period associated with a timer. The WTRU may reset the timer at each reception/transmission associated with such V2X service. The WTRU may return to use of K1 candidate slots for sensing upon the expiry of such timer.

In an example, a WTRU may determine the number of candidate slots for its sensing procedure based on the amount of receptions/transmissions associated with interested V2X services over the recent period or configurable time window. For example, the WTRU may be configured/pre-configured with a time window (e.g. a sliding window in time, relative to the current slot) over which the WTRU measures the number of receptions/transmissions associated with an interested V2X service (e.g. set of interested L2 IDs). The WTRU may be configured with a mapping between a range of number of receptions/transmissions and several candidate slots for sensing. For example, if the number of receptions/transmissions in the time window is in the range X=[x1, x2], the WTRU may use a correspondingly configured number of candidate slots K within the selection window [T1, T2].

In an example, a WTRU's number of candidate slots for transmission/sensing may be determined based on another parameter or aspect related to the activity behavior, which may be defined as the DRX activity or sensing activity of the WTRU. For example, the WTRU may be configured with the first number of candidate slots during the WTRU's on duration (or some number of slots prior to or following the on duration), and a second number of candidate slots outside of its on duration (or outside of this number of slots). The on duration may correspond to the on-duration of another WTRU or group of WTRUs, and/or may be the WTRUs own on-duration. In an example, the WTRU may be configured with several candidate slots determined by how often the on-duration is repeated at the WTRU (e.g. DRX cycle) and may change the number of candidate slots due to a change of the on-duration frequency.

Dynamic adaption of the sensing window as a function of transmission activity may be implemented. For example, the WTRU may dynamically adapt its sensing activity and/or its sensing window as a function of the scheduling activity and/or resource usage (e.g., within a specific resource for the V2X session over a given period), which may be determined based on the channel occupancy (CR) of the WTRU. The WTRU may use a first sensing window size when a DRX timer T is running, start or restart the timer when the WTRU determines that there is transmission activity, and use a second sensing window size upon expiration of the timer.

The WTRU may determine that there is scheduling activity based on, for example sensing (e.g., sensing only), sensing and decoding of control information, decoding of control information only, and/or a transmission of control information. The WTRU may determine that the transmission of control information is associated with a session of the WTRU's configuration. The WTRU may additionally use the first sensing window size according to a fixed (e.g., configured), period.

In an example, the WTRU may determine a set of slots and/or subchannels to perform sensing on based on a sensing type (e.g. short-term sensing or long-term sensing). For example, for short-term sensing, the WTRU may perform sensing in all subchannels of the resource pool. The WTRU may perform sensing in a subset of subchannels in the resource pool. The subset of subchannels may be determined based on the subchannels of the reserved resource and/or the subchannels used for resource selection. For example, the WTRU may perform long-term sensing to re-evaluate the resource reserved for periodic transmissions. The WTRU may then perform sensing in the set of subchannels reserved for periodic transmission. In an example, the WTRU may perform long-term sensing in the set of subchannels used for resource selection.

Figure 7:
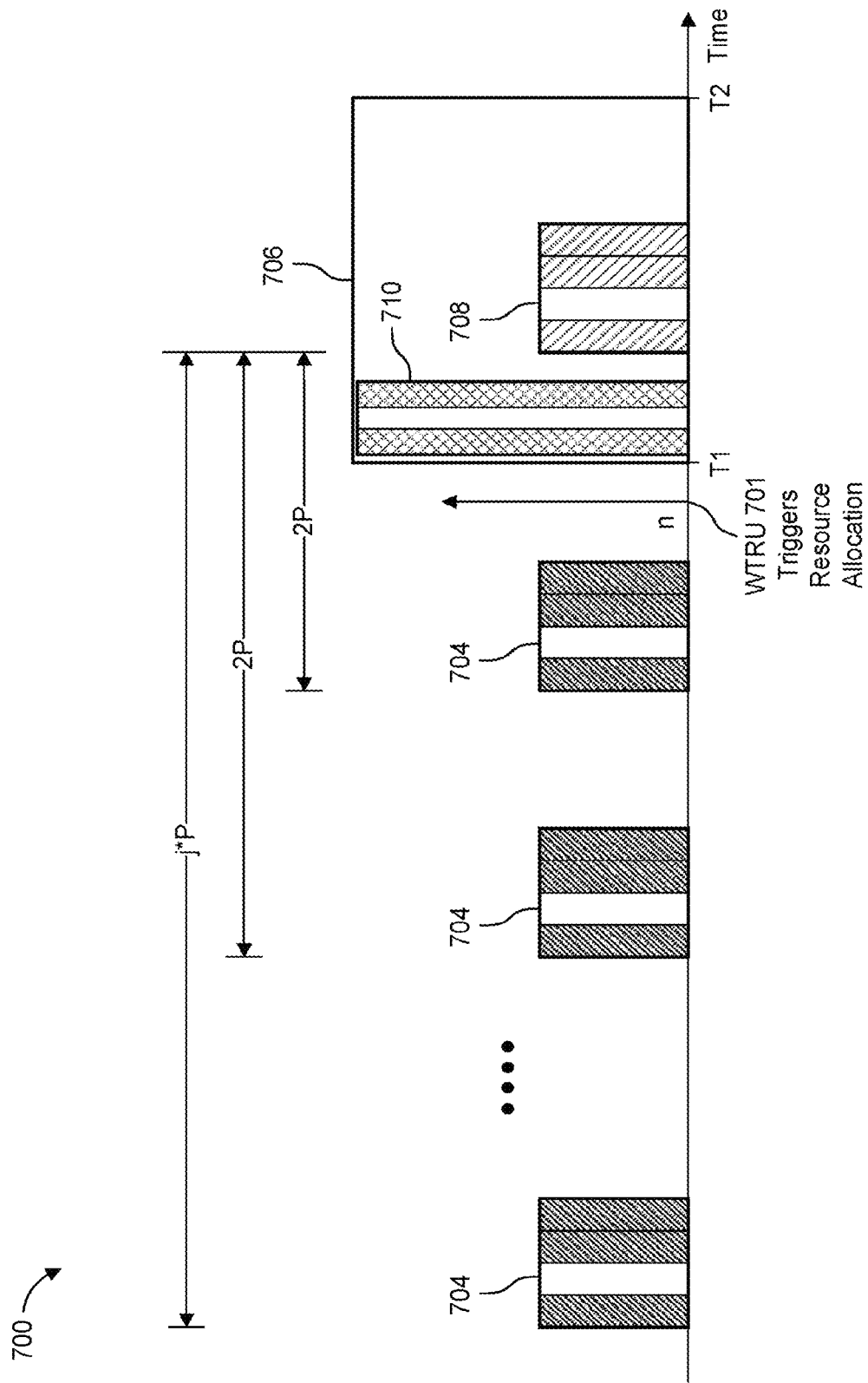
FIG. 7 shows a timing diagram of example sensing windows, sub-windows and subchannels that may be used for a sensing procedure.

FIG. 7 shows a timing diagram of example sensing windows, sub-windows and subchannels that may be used for a sensing procedure 700 performed by a WTRU 701, where the sensing procedure 700 includes long-term partial sensing and short-term partial sensing. In the example of FIG. 7, the WTRU 701 may perform long-term sensing during one or more long-term partial sensing windows/sub-windows 704 in the set of subchannels used for resource selection, and the WTRU 701 performs short-term sensing during short-term partial sensing window 710 in all subchannels of the resource pool. In the example of FIG. 7, the short-term partial sensing window 710 occurs after the WTRU 701 triggers resource allocation at time n, and during the resource selection window 706. The short-term partial sensing window 710 ends before the start of resource selection sub-window 708. The set of subchannels in the resource selection sub-window 708 is the same as the set of subchannels monitored in the long-term partial sensing windows/sub-windows 704.

In an example, the WTRU may perform partial sensing for preemption. The WTRU may determine that it will perform full sensing for resource selection. The WTRU may perform partial sensing for resource re-evaluation. The WTRU may perform partial sensing for resource re-evaluation of a selected resource (e.g., a resource that has not been reserved by an SCI) and/or for a reserved resource (e.g., a resource that has been reserved by an SCI).

In an example, a WTRU may trigger sensing adaptation by changing the set of resources to perform sensing based on any one or more of the following conditions: the WTRU performing resource evaluation/re-evaluation (e.g., the WTRU may trigger changing of the set of resource for sensing after each time the WTRU performs resource allocation and reservation); and/or if CBR is greater or smaller than a threshold (e.g., the WTRU may trigger changing the set of resources for sensing if CBR is greater and/or smaller than a threshold). In an example, a WTRU may perform sensing adaptation periodically. For example, the WTRU may periodically perform resource evaluation to determine whether it needs to adapt the set of resource to perform sensing or not. If the criteria for sensing adaptation is satisfied, the WTRU may change the set of resources for sensing accordingly.

In an example, a power saving WTRU may use a bitfield in the SCI to indicate its WTRU type, sensing type, and/or capacity. For example, for the bitfield, one codepoint may be used to indicate that the WTRU is a power saving WTRU (e.g., PUE) and another codepoint may be used to indicate the WTRU is a non-power saving WTRU (e.g., VUE).

In an example, a WTRU may distinguish between the resource reserved by power saving WTRU and non-power saving WTRU in the resource evaluation/re-evaluation procedure. The WTRU may consider the WTRU types and/or power saving type (e.g., power saving vs. non-power saving) differently in the resource (re-)evaluation procedure. In an example, the WTRU may be (pre-)configured with two sets of RSRP thresholds in which a first set of RSRP thresholds may be associated with a power saving WTRU (e.g., PUE) and a second set of RSRP thresholds may be associated with a non-power saving WTRU such as a vehicle WTRU (e.g., VUE). In another example, the WTRU may be (pre-)configured to apply different RSRP increment steps for the resources reserved by power saving WTRU from the RSRP increment steps for the resources reserved by a vehicle WTRU (e.g., a non-power saving WTRU). In another example, the WTRU may be (pre-)configured with different sets of maximum number of RSRP increments based on type of the WTRU. For example, a first set of maximum number of RSRP increments associated with a power saving WTRU (e.g., PUE) may be set to a first configured value (e.g., zero or a non-zero value), and a second set of the maximum number of RSRP increments associated with a non-power saving WTRU (e.g., VUE) may be set to a second configured value (e.g., infinity or some other value that may be different from the first configured value).

In an example, the WTRU (e.g., PUE) may modify the QoS parameters of its TB and may indicate a modified QoS in the SCI associated with the TB that the WTRU transmits to another WTRU. For example, the power saving WTRU may reduce the priority of the data by an offset value and indicate the modified value in the transmitted SCI. The offset may be fixed or (pre-)configured based on the priority of the TB. This approach may be motivated to help another non-power saving WTRU (VUE) to prioritize the transmission by the power saving WTRU and/or avoid (not use) the reserved resources of the power saving WTRU.

Figure 8:
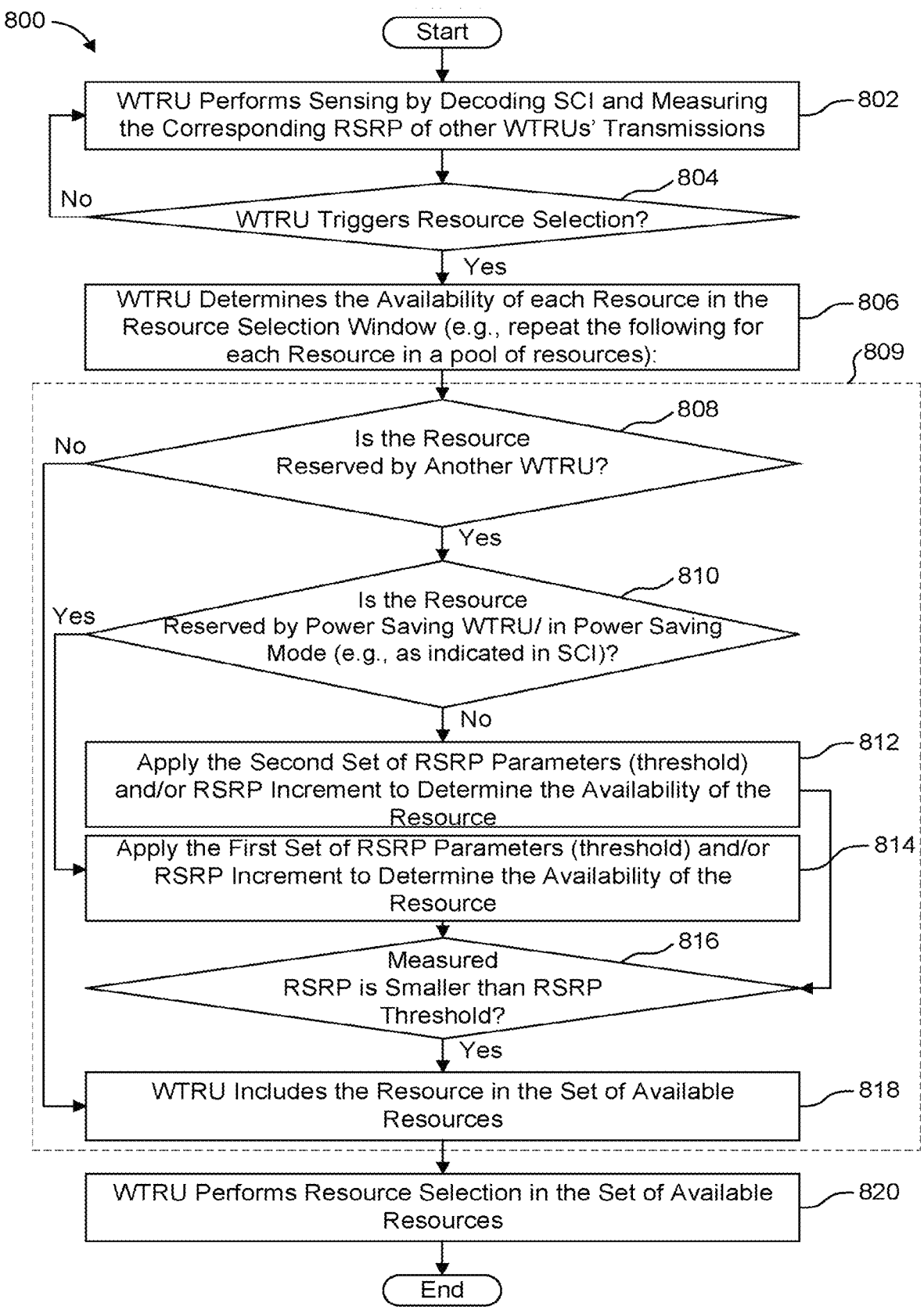
FIG. 8 shows a flow diagram of an example resource allocation procedure that may be performed by a first WTRU in order for the first WTRU to determine which resources to use for sidelink communications.

FIG. 8 shows a flow diagram of an example resource allocation procedure 800 that may be performed by a first WTRU in order for the first WTRU to determine which resources to use for sidelink communications. According to the resource allocation procedure 800, the first WTRU may determine different threshold parameters to be used during sensing based on a power saving mode of another WTRU and/or the power saving type of the other WTRU reserving the resources. Examples of power saving types of WTRUs include power saving WTRU (e.g., PUE) and non-power saving WTRU (e.g., VUE, vehicle WTRU), and examples of power saving modes include a WTRU operating in a first power saving mode and a WTRU operating in second power saving mode, such that operation according to the first power saving mode uses less power than operation according to the second power saving mode. In an example, power saving WTRUs and WTRUs operating in a first power saving mode may have a similar priority and may use the same thresholds (i.e., may be considered equivalently), and non-power saving WTRUs and WTRUs operating in second power saving mode (e.g., a non-power saving mode or a power saving mode that uses more power compared to the first power saving mode) may have a similar priority and may use the same thresholds (i.e., may be considered equivalently). The first WTRU may perform sensing during a sensing window (e.g., long-term partial sensing window, short-term partial sensing window), which may occur before or after the first WTRU triggers resource selection.

At 802, the first WTRU may perform sensing by decoding SCI and measuring the RSRP of the transmissions associated with the SCI received from other (second) WTRUs. At 804, the first WTRU may determine when the first WTRU triggers resource selection. For example, the first WTRU may trigger resource selection when the first WTRU has data to send to another (second) WTRU over a sidelink. On a condition the first WTRU triggers resource selection, at 806 the first WTRU may determine the availability of each resource from among a plurality of resources in the resource selection window, by repeating the steps in 809 for each resource in the plurality of resources assigned to the resource selection window. For example, the plurality of resources may be a pool of resources for transmission. For example, the pool of resources for transmission may be configured/(pre-)configured at the WTRU for possible sidelink transmission (e.g., by the eNB, or by another WTRU). In an example, a resource in the pool of resources may be a set of contiguous subchannels in a slot. At 808, for each resource, the first WTRU may determine if the resource is reserved by another (second) WTRU, for example based on the last transmission of SCI received by the first WTRU from the second WTRU. If the resource is not reserved by another (second) WTRU, at 818 the first WTRU may add the resource to a set available resources.

If the resource is reserved by another (second) WTRU, at 810, the first WTRU may determine if the resource is reserved by a second WTRU that is a power saving WTRU (e.g., a PUE) and/or a WTRU in power saving mode. For example, the first WTRU may determine if the resource is reserved by a second WTRU that is a power saving WTRU and/or a WTRU in power saving mode by verifying an indicator for power saving mode and/or power saving type in an SCI received from the second WTRU or another WTRU. If the first WTRU determines that the resource is reserved by a second WTRU that is a power saving WTRU and/or a WTRU in power saving mode, at 814 the first WTRU may apply a first set of RSRP parameters and/or RSRP increments as the selected RSRP parameters and/or selected RSRP increments used to determine the availability of resources. If the first WTRU determines that the resource is reserved by a second WTRU that is not a power saving WTRU and/or a WTRU in power saving mode, at 812 the first WTRU may apply a second set of RSRP parameters and/or RSRP increments as the selected RSRP parameters and/or selected RSRP increments used to determine the availability of resources. In one example, the first WTRU may be configured/pre-configured with a lower RSRP threshold when the second WTRU is a power saving mode WTRU and higher RSRP threshold when the second WTRU is a non-power saving mode WTRU. Using different thresholds, the first WTRU may be able to avoid selecting the reserved resources of another WTRU that is a power saving mode WTRU, which may help to protect the transmission of the power saving mode WTRU. The RSRP parameters may include at least one RSRP threshold for determining the use of resources.

At 816, the first WTRU uses the RSRP threshold from the selected RSRP parameters and determines if a measured RSRSP for the resource being considered is below the RSRP threshold. If the measured RSRSP for the resource is below the RSRP threshold, at 818 the first WTRU adds the resource to a set available resources. Steps 808-818 are repeated for all resources in the resource selection window. At 820, the first WTRU performs resource selection (e.g., during the resource selection window) from among the determined set of available resources.

Figure 9:
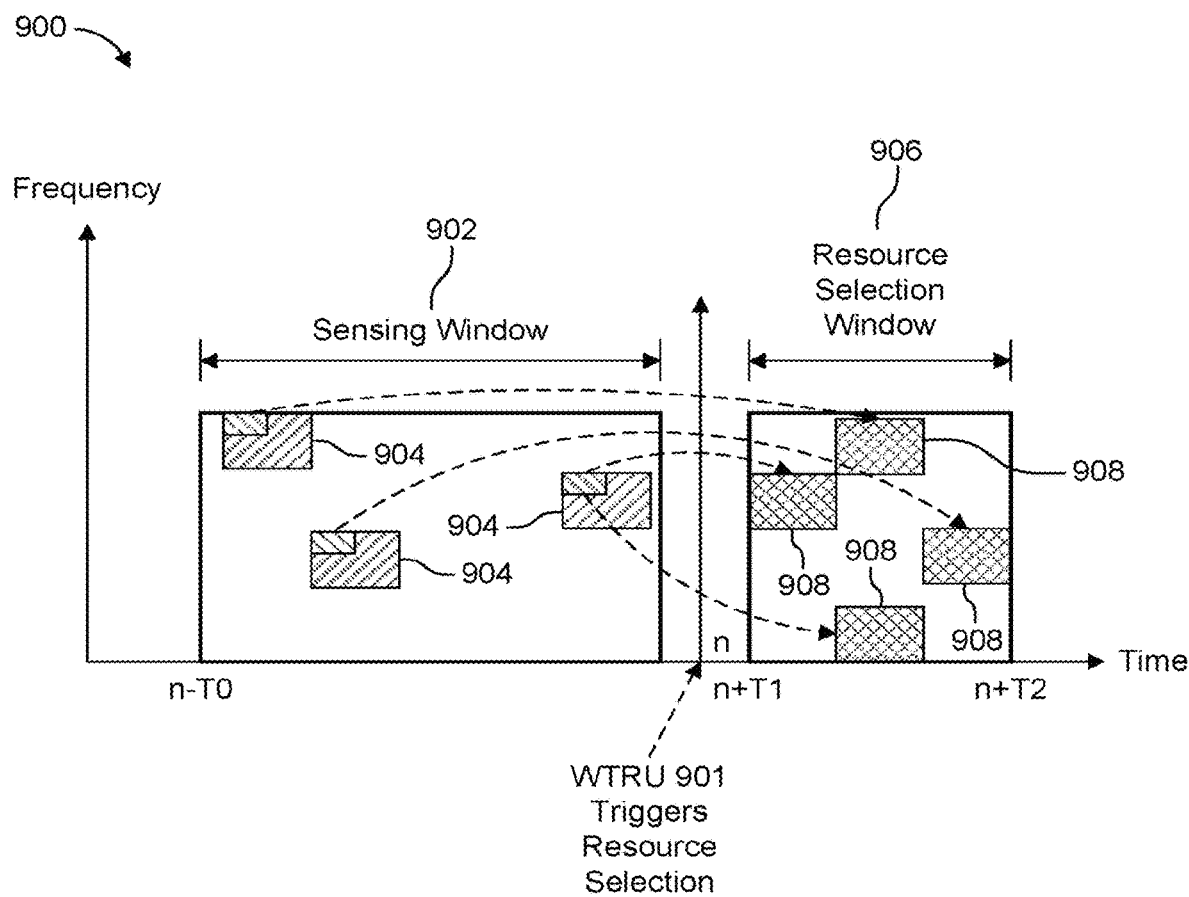
FIG. 9 shows a timing diagram of an example resource selection procedure.

FIG. 9 shows a timing diagram of an example resource selection (resource allocation) procedure 900 that may be performed by a first WTRU 901. The example resource selection procedure 900 shown in FIG. 9 may correspond to the example resource allocation procedure 800 shown in FIG. 8, or any subset of the example resource allocation procedure 800. With reference to FIG. 9, a first WTRU 901 may perform sensing for availability of a plurality of resources 904, for example by receiving and decoding SCI from other (second) WTRUs to determine if any of the plurality of resources 904 are reserved by any of the other (second) WTRUs. The sensing may occur during sensing window 902 and may occur before the WTRU 901 triggers resource selection at time n. In the example of FIG. 9, other WTRUs may have transmissions in all the plurality of resources 904, as determined during the sensing window 902. SCI associated with each transmission in the resources 904 reserves one resource 908 in the resource selection window 906. Thus, during the resource selection window 906, all the plurality of resources 908 may be reserved by other WTRUs and may not be used by the first WTRU 901 for transmission.

In an example, the WTRU may perform CBR measurement based on the set sensed subchannels and slots. The WTRU may measure CBR using one or more of the following: long-term partial sensing, short-term partial sensing, or both long-term and short-term partial sensing. In an example, the WTRU may perform CBR measurement using long-term partial sensing. The WTRU may measure sidelink received signal strength indicator (RSSI) in the set of subchannels and slots it uses for long-term partial sensing. The WTRU may calculate CBR as a ratio of the number of busy subchannels to the total number of subchannels. A subchannel may be considered as busy if RSSI is greater than a threshold. In an example, the WTRU may perform CBR measurement using short-term partial sensing. The WTRU may measure sidelink RSSI in the set of subchannels and slots it uses for short-term partial sensing. The WTRU may calculate CBR as a ratio of the number of busy subchannels to the total number of subchannels. In an example, the WTRU may perform CBR measurement using both short-term and long-term partial sensing. The WTRU may measure sidelink RSSI in the set of subchannels and slots it uses for both short-term and long-term partial sensing. The WTRU may then calculate CBR as the ratio of the number of busy subchannels to the total number of subchannels.

Figure 10:
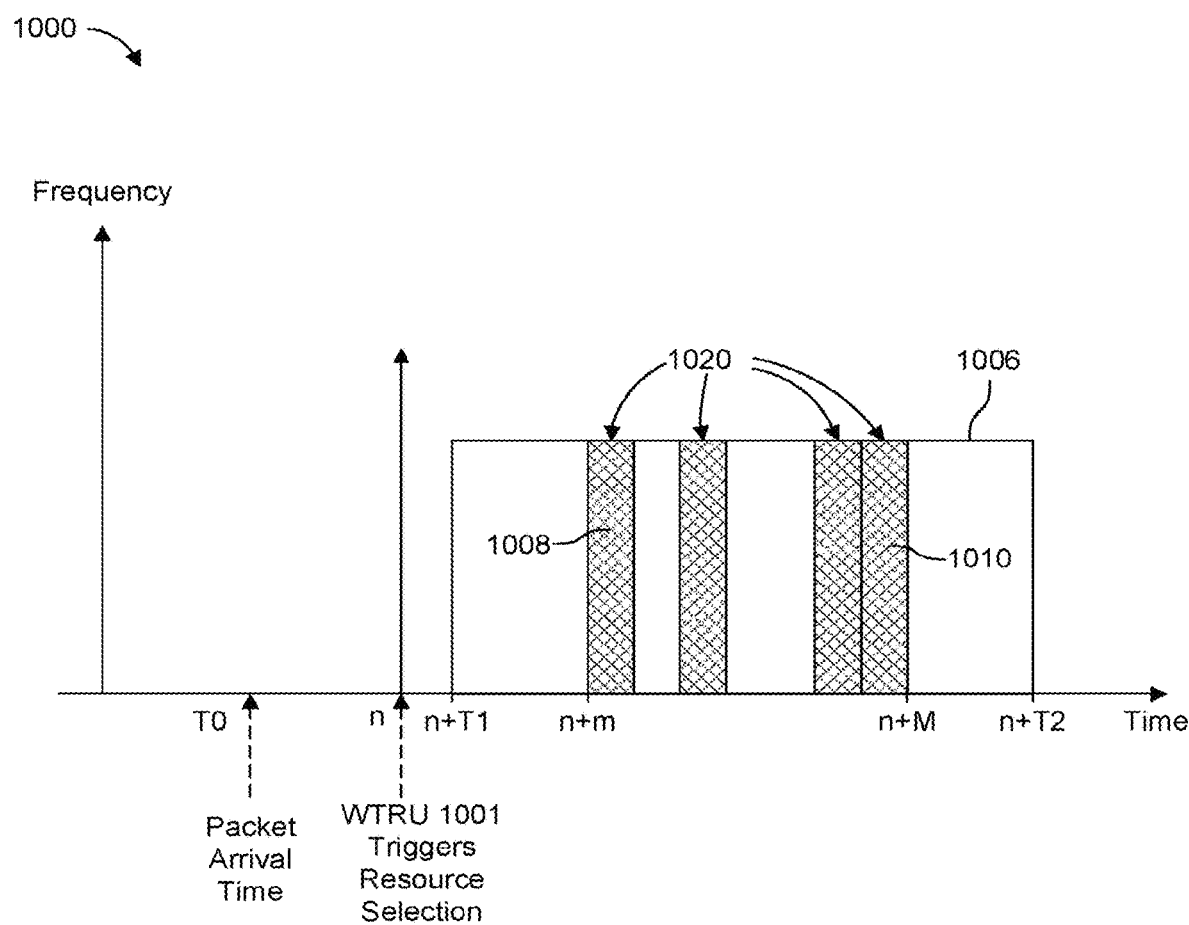
FIG. 10 shows a timing diagram of an example of resource selection timing procedure of a transport block (TB)

In an example, the WTRU may determine the resource selection timing of a TB. FIG. 10 shows a timing diagram of an example of resource selection timing procedure 1000 of a TB, that may be performed by a WTRU 1001. FIG. 10 shows examples of timing parameters for the resource selection timing of a TB. For example, the WTRU 1001 may determine any one or more of the following resource selection timing parameters that may pertain to the resource selection window 1006: the resource selection trigger time (i.e., the timing of n); the start of the initial resource selection window 1020 (i.e., the timing of n+T1); the end time of the resource selection window 1020 (i.e., the timing of n+T2); the timing of the first candidate slot 1008 (i.e., n+m), such that a candidate slot may be the slot in which the WTRU may evaluate the availability of the resources for potential resource selection; and/or the timing of the last candidate slot 1010 (i.e., n+M). In an example, the WTRU 1001 may determine resource selection timing parameters in response to the arrival of a TB at time T0.

In an example, a WTRU may determine any one or more of the parameters related to the resource selection timing of a TB (e.g., the minimum/maximum values of T1, T2, T2−T1, m, M, M−m, etc.) based on any one or more of the following conditions: the resource selection type (e.g., random based, full sensing-based, and/or partial sensing-based); the QoS of the TB; the CBR of the resource pool and/or CR of the WTRU; the timing of the first candidate slot, the packet arrival time, and/or the gap between packet arrival time and the first candidate slot; whether resource (re-)evaluation of enabled/disabled; the size of the pending TB or the expected TB; the number of candidate slots and/or the number of candidate resources in a period; HARQ type of the TB (e.g., HARQ enabled and HARQ disabled TB); cast type of the TB (e.g., broadcast, unicast, or groupcast); DRX status of the WTRU; the power saving mode of the WTRU; whether the WTRU performs resource selection for initial selection, (re-)evaluation for a selected resource, or (re-)evaluation for a reserved resource; whether semi-persistent is enabled/disabled in the resource pool; and/or the resource selection type of the TB.

For the resource selection type, the WTRU may trigger resource selection for the TB upon the arrival of the packet if it performs random resource selection. The WTRU may trigger resource selection for the TB at least/most transmission (Tx) slots before the first candidate slots. For example, regarding whether resource (re-)evaluation of enabled/disabled, the WTRU may trigger resource selection for the TB at the least or most Tx slots before the first candidate slots if resource (re-)evaluation is enabled. In another example, the WTRU may trigger resource selection for the TB at least or most Ty slots before the first candidate slots if resource (re-)evaluation is disabled. The value of Tx and/or Ty may be (pre-)configured per resource pool based on other parameters such as the QoS of the TB, the time gap between the packet arrival time and/or the first candidate slot.

For QoS of a TB, the WTRU may be (pre-)configured with the minimum/maximum value of the first and/or the last candidate slot (i.e., m and M) as a function of the QoS of the TB (e.g., the priority of the TB). The WTRU may then determine the value of m and M accordingly based on the QoS of the TB.

For CBR of the resource pool and/or CR of the WTRU, the WTRU may be (pre-) configured with multiple sets of resource selection timing parameters (e.g., the minimum/maximum values of T1, T2, T2–T1, m, M, M–m, etc.) in which each set may be associated with one range of CBR and/or one range of CR. The WTRU may then determine which set of resource selection timing parameters to use based on the CBR of the resource pool and/or CR of the WTRU.

For the DRX, the WTRU may be (pre-)configured with multiple sets of resource selection timing parameters (e.g., the minimum/maximum values of T1, T2, T2–T1, m, M, M–m, etc.) in which each set may be associated with one DRX status of the WTRU. In an example, the WTRU may be (pre-)configured with one set of resource selection timing parameters when DRX is not (pre-)configured and another set of parameters when DRX is configured. In an example, the WTRU may be (pre-)configured with multiple sets of resource selection timing parameters, in which a first set may be used when DRX is not configured, a second set may be used when the WTRU is in DRX ON duration, and a third set may be used when the WTRU is in DRX OFF duration.

For power saving mode, the WTRU may be (pre-)configured with multiple power saving modes and in each power saving mode, the WTRU may be (pre-)configured a corresponding set of resource selection timing parameters. The WTRU may then determine which set of resource selection timing parameters to use based on its power saving mode.

For resource selection type, the WTRU may be (pre-) configured with multiple sets of resource selection timing parameters (e.g., the minimum/maximum values of T1, T2, T2–T1, m, M, M–m, etc.) in which each set of resource selection timing parameters may be associated with one corresponding resource selection type. The WTRU may then determine a range of CBR and/or a range of CR. The WTRU may then determine which set of resource selection timing parameters to use based on the CBR of the resource pool and/or CR of the WTRU.

For example, for the number of candidate slots and/or the number of candidate resources in a period, the WTRU may determine the resource selection triggering time based on the number of candidate slots in a period (e.g., the period from packet arrival time to the PDB). For example, if the number of candidate slots is greater than the required minimum number of candidate slots, the WTRU may continue to perform sensing and trigger resource selection when the number of candidate slots is equal to the minimum number of candidate slots. Otherwise, the WTRU may trigger resource selection when the packet arrives.

For example, for the HARQ type of the TB (e.g., HARQ enabled and HARQ disabled TB), the WTRU may be (pre-)configured the minimum number of candidate slots and/or the minimum resource selection window (e.g., the minimum of [n+m, n+M]) based on the HARQ type of the TB. The WTRU may determine the resource selection window to satisfy the required minimum number of candidate resources and/or the minimum resource selection windows accordingly based on whether the TB is HARQ enabled/disabled. For example, the WTRU may be (pre-)configured with a first value of (M–m) for a HARQ-enabled TB and the WTRU may be (pre-)configured a second value of (M–m) for HARQ-disabled TB, where the second value of (M–m) is smaller than the first value of (M–m).

In an example, the DRX status of the WTRU may include any one or more of the following criteria: whether DRX is configured; and/or whether the WTRU in on duration or off duration. In an example, the WTRU may determine whether physical sidelink shared channel (PSSCH) demodulation reference signal (DMRS) or physical sidelink control channel (PSCCH) is used to measure the availability of a channel based on whether DRX is configured, and/or whether the WTRU is in a DRX on duration or off duration. For example, the WTRU may determine to use PSCCH DMRS if DRX is configured, and/or the WTRU in on duration. In an example, the WTRU may determine to use PSSCH DMRS if DRX is not configured, and/or the WTRU in off duration.

In an example, regarding whether the WTRU performs resource selection for initial selection, (re-)evaluation for a selected resource, or (re-)evaluation for a reserved resource, the WTRU may be (pre-)configured three number of candidate slots for initial resource selection, (re-)evaluation for a selected resource, and (re-)evaluation for a reserved resource. Then, the WTRU may determine the resource selection window to satisfy the required minimum number of candidate slots for initial selection, (re-)evaluation for a selected resource, or (re-)evaluation for a reserved resource, accordingly.

According to an example of resource allocation, a WTRU may determine is resource selection type. A WTRU may determine any of the following resource allocation types for a TB: sensing-based (e.g., full sensing-based or partial sensing-based); and/or random. The determination of the resource allocation type for a TB may be made based on one or more of the following criteria: a configuration/pre-configuration; packet arrival time; QoS of the data; CBR of the resource pool; availability of the sensing result; the number of the sensed slots within the resource selection window; and/or remaining available battery life.

In an example, a resource pool may allow both random resource allocation and sensing-based resource selection. The WTRU may determine to perform random resource allocation or sensing-based resource selection based on the QoS of the TB. For example, the WTRU may perform random resource selection if the priority of the TB is smaller than a threshold and the WTRU may perform sensing-based resource selection if the priority of the TB is smaller than a threshold.

In an example, a WTRU may determine whether to perform sensing-based resource allocation or random resource selection in a resource pool based on the number of sensed slots in the sensing window (e.g., the number of sensed slots may refer to the number of sensed slots in the long-term partial sensing window or short-term partial sensing window or both sensing windows). For example, if the number of sensed slots in the sensing window is smaller than a threshold, the WTRU may determine to perform random resource selection or drop the TB. Otherwise, the WTRU may determine to perform sensing-based resource allocation.

In an example, the WTRU may configure/pre-configure two sets of resource pools, in which one set may be associated with the transmissions to power saving WTRUs (e.g., PUEs) and the other set may be associated with the transmission to non-power saving WTRUs (e.g., VUEs). The WTRU may be further configure/pre-configure two sets of destinations (or any indication related to the service which can be used to differentiate the target WTRUs as VUEs and/or PUEs) in which one set of destinations is not associated with the power saving WTRU (e.g., PUE) and the other set of destinations is associated with the power saving WTRU (e.g., PUE). The WTRU may determine the transmission resource pool to use based on whether the destination is associated with the power saving WTRU (e.g., PUE) or not.

In an example, the WTRU may configure/pre-configure one resource pool. The WTRU may determine the set of subchannels and/or slots to perform resource allocation for transmission of TB within the resource pool based on the target WTRUs of the TB, such as whether the target WTRUs has a power saving WTRU (e.g., PUE) or not. For example, the WTRU may perform resource allocation in all subchannels if a PUE is not included in the set of target WTRUs; otherwise, the WTRU may perform resource selection in a subset of the subchannels. The subset of subchannels may be determined based on one or any of the location of the WTRU, the CBR of the resource pool, and/or the QoS of the TB.

In an example, a WTRU (e.g., a PUE) may apply a timing restriction between two selected resources when it performs resource selection. The WTRU may select a time gap of two transmission resources (e.g. the time gap between the initial transmission and the first retransmission) to be higher than a threshold. The threshold may be (pre-) configured as a function of the transmission priority or it can be fixed per resource pool. This approach may be motivated to support other WTRUs (e.g., a VUE) in resource re-evaluation to detect a potential collision. In an example, a WTRU may determine the set of selectable resources (for example, the set of resources to report to MAC layer) based on its time/frequency region. In one approach, the WTRU may divide the set of time/frequency resources into multiple of the following sets: the set of sensing-based selection resources; and/or the set of random selection resources. The WTRU may determine the set of selectable resources by firstly selecting in the set of sensing-based resources. If the set of the selectable resources in the sensed time/frequency resources is smaller than a threshold, the WTRU may further select the resource from the set of random selection resources.

Mechanisms may be used for resource evaluation/re-evaluation. In an example, the physical (PHY) layer of a WTRU (e.g., a VUE) may perform resource evaluation by determining the set of selectable resources to report to the medium access control (MAC) layer. The MAC layer may randomly select one or multiple resources within the set of resources reported by the PHY layer for transmissions of TB.

In an example, the WTRU may perform resource evaluation/re-evaluation. The WTRU may perform resource evaluation/re-evaluation by doing one or more of determining whether its selected/reserved resource collides with any reserved resource from other WTRUs, selecting a new resource for transmission of the WTRU, dropping the TB, and/or dropping the reserved resource which collides with another WTRU.

In an example, the WTRU may perform resource evaluation/re-evaluation by doing one or more of determining whether its selected/reserved resource collides with any reserved resource from other WTRUs. The WTRU may determine whether its reserved resource collides with any reserved resource from other WTRUs by evaluating the sensing results in the subset of the sensing resources. For example, the WTRU may evaluate the slots and/or subchannels in which transmission in these slots and/or subchannels may reserve a resource collide with the potential transmission of the WTRU. The WTRU may perform this type of resource evaluation/re-evaluation periodically or based on an event. The event may be based on one or any of the WTRU performing resource selection/re-selection, and/or the CBR of the resource pool is greater/lower than a threshold.

The WTRU may perform resource evaluation/re-evaluation in one of evaluation/re-evaluation for a selected resource, and/or evaluation/re-evaluation for a reserved resource. In the evaluation/re-evaluation for a selected resource implementation, the WTRU may perform resource evaluation/re-evaluation after it selects the resources for transmission of a TB and before it transmits an SCI to reserve the resource. In the evaluation/re-evaluation for a reserved resource implementation, the WTRU may perform resource evaluation/re-evaluation for a resource that has been reserved by an SCI of the WTRU. The resource may be reserved semi-persistently for different TB(s) or the resource may be reserved dynamically for a retransmission of the same TB. The WTRU may perform evaluation/re-evaluation before the transmissions of a TB for the semi-persistent reservation. In another example, it may perform evaluation/re-evaluation after the initial transmission of the TB for a dynamic reservation.

A WTRU may perform resource evaluation when it triggers resource selection. For example, the WTRU may determine whether to trigger resource evaluation/re-evaluation (evaluation/re-evaluation for a selected resource and/or evaluation/re-evaluation for a reserved resource) or not trigger resource evaluation/re-evaluation based on one or more of the following example criteria: whether the WTRU performs short-term partial sensing or not; the QoS of the TB; CBR of the resource pool; the amount of selectable resources for resource; the HARQ retransmission type for the TB; whether the WTRU performs semi-persistent reservation for the TB or not; the reservation period of the semi-persistent reservation; period of resource evaluation/re-evaluation; and/or if semi-persistent reservation is enabled/disabled.

In an example, the WTRU may determine whether to trigger resource evaluation/re-evaluation or not based on whether it performs short-term partial sensing or not. For example, the WTRU may not trigger re-evaluation for the selected resources if short-term partial sensing is not performed. In an example, the WTRU may determine whether to trigger resource evaluation/re-evaluation or not based on the QoS of the TB. For example, the WTRU may trigger resource re-evaluation if the priority of the TB is greater than a threshold and it may not trigger resource re-evaluation if the priority of the TB is smaller than a threshold.

In an example, the WTRU may determine whether to trigger resource evaluation/re-evaluation or not based on the CBR of the resource pool. For example, the WTRU may trigger resource re-evaluation if the CBR of the resource pool is greater than a threshold. Otherwise, it may determine not to trigger resource re-evaluation.

In an example, the WTRU may determine whether to trigger resource evaluation/re-evaluation or not based on the amount of selectable resources for resource selection. For example, the WTRU may trigger resource evaluation/re-evaluation if the amount of selectable resources in the last resource evaluation/re-evaluation is smaller than a threshold. Otherwise, it may not trigger resource evaluation/re-evaluation. In an example, the WTRU may determine whether to trigger resource evaluation/re-evaluation or not based on the HARQ retransmission type for the TB. For example, the WTRU may trigger resource re-evaluation if the WTRU performs blind retransmission for the TB and not to trigger resource re-evaluation if the WTRU performs HARQ-based retransmission or mixture of HARQ-based and blind retransmission.

In an example, the WTRU may determine whether to trigger resource evaluation/re-evaluation or not based on whether the WTRU performs semi-persistent reservation for the TB or not. For example, the WTRU may trigger resource re-evaluation if it performs semi-persistent reservation and it may not trigger resource re-evaluation if it does not perform semi-persistent reservation. In an example, the WTRU may determine whether to trigger resource evaluation/re-evaluation or not based on reservation period of the semi-persistent reservation. For example, the WTRU may perform resource (evaluation/re-evaluation if the reservation period is smaller than a threshold it may not perform resource evaluation/re-evaluation if the reservation period is larger than a threshold. The threshold of the reservation period to determine whether the WTRU needs to perform resource evaluation/re-evaluation may be configured/pre-configured per resource pool.

In an example, the WTRU may determine whether to trigger resource evaluation/re-evaluation or not based on the period of resource evaluation/re-evaluation. For example, the WTRU may configure/pre-configure a minimum period to perform resource evaluation/re-evaluation for each sidelink process. The WTRU may determine whether it performs resource evaluation/re-evaluation for transmissions of a certain TB based on the time gap between the reserved resource of the current TB and the reserved resource of the last TB being evaluated/re-evaluated. For example, if the time gap is greater than the threshold, the WTRU may perform resource evaluation/re-evaluation; otherwise, the WTRU may not perform resource evaluation/re-evaluation. This approach may be motivated to allow the WTRU to skip monitoring for a period to save power. In an example, the WTRU may determine whether to trigger resource evaluation/re-evaluation or not based on if the semi-persistent reservation is enabled/disabled. For example, the WTRU may trigger resource evaluation/re-evaluation if semi-persistent is disabled in a resource pool; otherwise, it may not trigger resource evaluation/re-evaluation.

A WTRU may trigger resource evaluation and/or resource allocation based on one or more of the timing of the first sensed/selectable slot in the resource selection sub-window, the termination of short-term partial sensing, periodicity. In an example, the WTRU may trigger resource evaluation and/or resource allocation based on the timing of the first sensed/selectable slot in the resource selection sub-window. For example, the WTRU may trigger resource selection and/or resource evaluation at least T3 slots before the first sensed slots in the resource selection window. The value of T3 or the minimum/maximum value of T3 may be (pre-)configured or determined by the WTRU based on the QoS of the TB. This approach may allow the WTRU to have available resources to select within the sensed slots. In an example, the WTRU may trigger resource evaluation and/or resource allocation based on the termination of short-term partial sensing. For example, the WTRU may trigger resource re-evaluation when it finishes short-term partial sensing.

In an example, the WTRU may trigger resource evaluation and/or resource allocation-based periodicity. For example, the WTRU may determine to perform resource (re-)evaluation for semi-persistent reservations of a sidelink process periodically. For example, the WTRU may perform resource (re-)evaluation every transmission of N TB. The value of N may be configured/pre-configured and/or may be determined based on the reservation period of the sidelink process.

The WTRU may perform resource (re-)evaluation for a semi-persistent reservation resource. In an example, the WTRU may perform resource (re-)evaluation for a semi-persistent reservation resource. The WTRU may be (pre-)configured the minimum number of resources and/or periods to be (re-)evaluated based on any one or more of the following criteria: the QoS of the TB; and/or the periodicity of the semi-persistent reservation. In an example, the WTRU may perform resource (re-)evaluation to satisfy the minimum number of resources and/or periods to be (re-)evaluated. For example, the WTRU may be (pre-)configured to perform resource (re-)evaluation at least one time per N slots. The value of N may be (pre-)configured per QoS of the TB. The WTRU may then determine to perform resource (re-)evaluation at in one period after each N slot. The WTRU may determine to perform resource (re-)evaluation periodically and/or dynamically.

A WTRU may determine the set of subchannels to select based on the resource selection type. For example, if the WTRU performs random resource selection, the WTRU may select the resource in all subchannels configured for the resource pool. However, if the WTRU performs sensing-based resource selection, the WTRU may select the resource in the sensed subchannels. In an example, the WTRU may perform resource selection to determine a set of resources for transmission. The WTRU may further select one or multiple other sets of resources for backup. The WTRU may select the set of backup resources for potential transmission if it detects a potential collision in the first set of transmission resources.

The WTRU may apply the time/frequency restriction between the set of resources for transmission and the set of resources for backup. The WTRU may select a transmission resource and its associated backup resource satisfying any one or more of the following criteria; the time gap between two selected resources is smaller or equal to a threshold (the time gap threshold may be zero, for example, in which case, the two selected resources may be in the same slot); the frequency gap between two resources is smaller than a threshold or the two selected resource belongs to one subset of subchannels; and/or the frequency gap between two selected resources is larger than a threshold or the two selected resources belong to different subsets of subchannels. In an example, the WTRU may select one transmission resource and its associated backup resource to be in the same slot and/or in the same set of subchannels. This approach may reduce the sensing time to the WTRU.

In an example, the WTRU may perform short-term partial sensing before performing resource re-evaluation of the reserved resources and/or backup resources. The size of the sensing window may be (pre-)configured based on any one or more of the following criteria: The QoS of the TB and/or CBR of the resource pool (e.g., the WTRU may be (pre-)configured a minimum sensing window and/or a minimum number of sensed slots before performing resource re-evaluation as a function of the priority of the TB and/or the CBR of the resource pool, and the WTRU may then determine the sensing window based on these parameters); and/or the periodicity of the reserved resource (e.g., the WTRU may select a long sensing window if the periodicity of the reserved slot is large, or the WTRU may select a short sensing window). In an example, the WTRU may be (pre-)configured the set of time/frequency resources to perform sensing to detect potential collision in a time/frequency resource. The WTRU may then determine the sensing resources to detect potential collision based on the (pre-) configured time/frequency relation and the set of time/frequency resources the WTRU targets to perform sensing.

The WTRU may determine to perform resource re-evaluation for its reserved resources and/or backup resources. The WTRU may determine how often the WTRU performs resource re-evaluation for a set of semi-persistent reservation resources (e.g., an SPS process) and/or the backup resources based on any one or more of the following criteria: the QoS of the TB (e.g., for each transmission priority, the WTRU may be (pre-) configured with a minimum number of resource re-evaluations per N reservation periods, and/or a minimum number of resource re-evaluations per fixed duration, for example 1s, and the WTRU may then randomly determine which transmission period to perform resource re-evaluation to satisfy the required resource re-evaluation criteria); the reservation periodicity *e.g., the WTRU may be (pre-) configured to perform at least X resource re-evaluations for Y transmissions, such that the WTRU may then randomly select X resource re-evaluations out of Y transmissions, and the value of X may be configured as a function of the priority of the TB such that when value of X may be zero, the WTRU may determine not to perform resource re-evaluation); the number of reserved resources per reservation period (e.g., the WTRU may determine the number of resource re-evaluations as a function of the number reserves more resources in a reservation period; and/or the CBR of the resource pool (e.g., the WTRU may be required to perform more resource re-evaluation when CBR is high and less resource re-evaluation when CBR is low).

The WTRU may reselect a transmission resource if it detects a collision. For example, if the WTRU detects a potential collision in one transmission resource, the WTRU may do any one or more of the following actions. In a first example action, the WTRU may replace the transmission resource with a corresponding resource. In a second example action, the may replace the set of transmission resources with the set of backup resources. The WTRU may perform the first example action for HARQ disabled TBs, and the WTRU may perform second example action for a HARQ enabled TB. In an example, the WTRU may reselect the backup resource if the WTRU detects a potential collision in the backup resource. The WTRU may reselect both the backup resource and the corresponding transmission resource if the WTRU is not able to select a backup resource satisfying the time and/or frequency restriction.

In an example, the WTRU may perform muting for an SPS sidelink process. The WTRU may perform one or more of the following example procedures: the WTRU may determine not to use the reserved resources in one or multiple reservation periods; the WTRU may determine not to use one or multiple reserved resources in one period; and/or the WTRU determine not to use the reserved resources in one or multiple reservation periods and determine not to use one or multiple reserved resources in one period. For example, the WTRU may use the first example method in a first time period and use the second example method in another time period. In an example, the WTRU may determine which period and/or which resource to mute based on any one or more of the following criteria: the QoS of the TB; the periodicity of the reserved resources; and/or the CBR of the resource pool (e.g., the WTRU may mute more resources in the congested scenario such as when the CBR is high, and the WTRU may mute fewer resources in the non-congested scenario such as when the CBR is low).

In an example, the WTRU may double the resource reservation period for the transmission before the muting period. The WTRU may indicate two times the reservation period in the SCI of the previous period if it determines to mute the transmission in the current period. This approach reserves the resource in the following period if the resource is available.

The WTRU may perform resource selection for the TB in the muting period. In the muting period, if the TB is available the WTRU may use another resource pool to perform transmission in this period. The WTRU may use the resource pool allowing random resource selection (e.g. exceptional resource pool) for transmissions of the TB. In an example, the WTRU may use dynamic resource selection to select the transmission resources for the current TB. The WTRU may perform resource re-evaluation to determine the availability of the reserved SPS sidelink process. For example, when the WTRU does not transmit in a reserved resource, the WTRU may perform reception in the reserved slots to determine whether there is any overlapping transmission in the reserved slot. If there is no transmission in the reserved resource, the WTRU may continue to use the reserved slots in the following period. If the WTRU detects a transmission in the reserved resource, the WTRU may decode the SCI of that transmission and the WTRU may perform any one or more of the following actions: if the SCI indicates a dynamic transmission, the WTRU may continue to use the reserved resource in the following period; and/or if the SCI indicates an SPS transmission, the WTRU may determine whether to use the reserved slot in the next period based on the percentage of collision. For example, if the percentage of collision in the SPS sidelink process is higher than a threshold (the threshold may be zero or greater than zero), the WTRU may determine to reselect another resource. However, if the percentage of collisions is smaller than the threshold, the WTRU may continue to use the SPS sidelink process.

Mechanisms for switching on/off sensing for a resource pool may be used. A WTRU may be configured/pre-configured for multiple resource pools associated with different cast types, service types, and/or sensing types. In an example, a WTRU may be configured to monitor multiple resource pools. Each resource pool may be associated with one or more of a sensing type, a cast type, and/or a service type.

In an example, each resource pool may be associated with a sensing type. For example, the WTRU may be configure/pre-configure a resource pool to perform default sensing, in which the WTRU may perform continuous sensing. The WTRU may further configure/pre-configure one or more other resource pools to perform non-continuous sensing. For example, the WTRU may perform sensing in these resource pools partially or based on an event-trigger. In an example, each resource pool may be associated with a cast type. For example, the WTRU may be configured one resource pool associated with broadcast or all casts and one or multiple other resource pools associated with unicast and/or groupcast. In an example, each resource pool may be associated with a cast type. For example, the WTRU may be configured one or multiple resource pools associated with basic safety service and one or multiple resource pools associated with advanced services. In another example, the WTRU may be configured one set of resource pools associated with power saving WTRUs (e.g., PUEs) and another set of resource pool associated with non-power saving WTRUs (e.g., VUEs).

A WTRU may trigger or turn on sensing in another resource pool. In an example, a WTRU may perform sensing in a first resource pool when the WTRU receives data/control from second resource pool that (implicitly or explicitly) triggers sensing in the second resource pool. For example, the WTRU may be configured to monitor multiple resource pools in which each resource pool may be associated with one or multiple services. The WTRU may be further configured in a resource pool in which it performs sensing to continuously or periodically determine the sensing activity in other resource pools. According to an example, the WTRU may be configured/pre-configured in a first default resource pool to perform continuous monitoring and second resource pool for non-continuous monitoring. In the first default resource pool, the WTRU may receive control and/or data from a second WTRU (e.g., the peer WTRU in the unicast session with the WTRU) that may trigger the first WTRU to perform sensing in another second resource pool. The control or data from the second (peer) WTRU may include any of the following information: the second (peer) WTRU initiates a unicast/groupcast session in another resource pool; the second (peer) WTRU switches the unicast/groupcast data to another resource pool; and/or the time/frequency resources used for the unicast/groupcast session.

The WTRU may switch off sensing in a resource pool. In an example, a WTRU may determine to switch off sensing in one resource pool based on any one or more of the following criteria: the WTRU detects/declares radio link failure (RLF) (e.g., by the WTRU using an access stratum (AS) layer or upper layer scheme) for one or multiple links having service associated with the resource pool; the WTRU receives (implicit or explicit) indication from a gNB, other node, or a peer WTRU to terminate the unicast/groupcast session (e.g., the WTRU may receive an SCI which does not reserve the resources for transmission of the future TB in the same unicast/groupcast session, and the WTRU may then terminate the unicast session and switch off sensing in the associated resource pool); the WTRU fails to detect control and/or data of the unicast/groupcast session in one or multiple reserved resources in one or multiple sidelink processes for the unicast/groupcast session; and/or the WTRU terminates one unicast session in a non-continuous sensing resource pool.

In an example, procedures may be used for random resource selection. In an example, a WTRU may determine whether to use sensing-based or random resource selection in a resource pool. A WTRU may be configured with a resource pool allowing both random resource selection and sensing-based resource selection. The WTRU may determine which resource selection scheme to use based on any one or more of the following criteria: the power saving mode/state of the WTRU; the CBR of the resource pool; the CR of the WTRU; the cast type of the TB; and/or, the QoS of the TB; And/or the timing of the first candidate slot, the last candidate slot, the packet arrival time, and/or the gap between packet arrival time and the first candidate slot.

In an example of resource selection scheme criteria being based on timing, the WTRU may perform random selection if the time gap between the packet arrival time and the first candidate slot is smaller than a threshold. The threshold may be (pre-)configured as a function of QoS of the TB and/or CBR of the resource pool. In an example, if the number of candidate slots satisfying the PDB of the TB being smaller than a threshold, the WTRU may determine to perform a random-based resource selection. The threshold may be (pre-)configured per QoS of the TB (e.g., priority) and/or CBR of the resource pool.

In an example, the WTRU may determine whether it can perform random resource allocation based on the power saving mode and/or power saving state of the WTRU. For example, the WTRU may be configured to two sets of power saving mode/state. In the first set of power saving mode/state, random resource selection may be allowed and in the second set of power saving mode/state, random selection may not be allowed. The power saving mode/state of the WTRU may be modelled by the sidelink and/or Uu interface activities of the WTRU.

In an example, the WTRU may determine whether it can perform random resource allocation based on CBR of the resource pool. For example, the WTRU may perform random resource selection when CBR of the resource pool is smaller than a threshold, and the WTRU may perform sensing-based resource allocation if CBR of the resource pool is greater than another threshold. In an example, the WTRU may determine whether it can perform random resource allocation based on a channel occupancy ratio (CR) of the WTRU. For example, the WTRU may perform random resource selection when CR is smaller than a threshold; otherwise, the WTRU may be required to perform sensing-based resource selection. The CR of the WTRU may be calculated/determined based on the resource transmitted and/or reserved from different resource selection types (e.g., random based, partial sensing based, and full sensing-based). For example, the WTRU may calculate three CRs, in which the first CR may be used to evaluate the channel occupancy ratio of the selected resources using random selection, the second CR may be used to evaluate the occupancy ratio of the selected resources using sensing-based selection, and the third CR may be used to evaluate the occupancy ratio of all resource. The WTRU may then determine whether to select the resource randomly based on the first CR.

In an example, the WTRU may determine whether it can perform random resource allocation based on the cast type and/or the HARQ type of the TB. For example, the WTRU may be allowed to perform random selection for broadcast TB and but may not be allowed to perform random selection for unicast/groupcast TB. In another example, the WTRU may be allowed to perform random selection for HARQ disabled TB but may not be allowed to perform random selection for HARQ enabled TB. In an example, the WTRU may determine whether it can perform random resource allocation based on the QoS of the TB. For example, the WTRU may be allowed to perform random selection for one set of priorities and may not be allowed to perform random selection for another set of priorities. For example, the WTRU may be allowed to perform random selection if the priority of the TB and/or the latency of the TB is smaller than a threshold. Otherwise, the WTRU may not be allowed to perform random selection. The priority and/or latency threshold may be configured per resource pool and/or per service.

In an example, the WTRU may indicate resource selection mode and/or power saving mode in a message. For example, the WTRU may use SCI (e.g., either SCI 1 or SCI) to indicate the resource allocation mode and/or power saving mode of the transmission resource. The WTRU may use one or more of the following example fields or indicators to indicate the resource allocation mode and/or power saving mode of the transmission resource: one field in the first and/or second SCI; and/or, a second SCI format. For example, the WTRU may use one SCI format for one set of power saving mode and/or resource allocation mode and another second SCI format for another set of power saving mode and/or resource allocation mode. In an example, the WTRU may prioritize resources reserved by different resource selection mode and/or power saving mode. For example, the WTRU may decode the SCI to determine the resource selection mode and/or power saving mode associated with the reserved resource. The WTRU may then use different RSRP thresholds when determining the availability of each reserved resource (e.g., as shown in the example procedure 800 of FIG. 8).

In an example, a WTRU may determine whether to reselect a collided resource based on the resource selection mode and/or power saving mode indicated in the SCI. A WTRU may determine whether the WTRU should reselect the resource due to resource re-evaluation procedure based on the resource selection mode and/or power saving mode associated with the reserved resource. For example, the WTRU may perform resource reselection if it selected/reserved resource collides with the resource reserved by a random selection procedure regardless of the priority associated with the resource. This approach may avoid collision with the random selection resource.

In an example, the WTRU may determine the resource selection window for a TB. The WTRU may use different sets of slots to select the resource for initial transmission and retransmission of a TB. For example, the WTRU may determine the set of partially sensed slots and non-sensed slots in the resource selection window. The WTRU may then randomly select the initial transmission from the set of available/selectable resources in the set of partially sensed slots. The WTRU may then randomly select the retransmission resources in the set of sensed and/or nonsense resources. This approach may reduce the collision probability for the initial transmission of the TB.

In an example, the WTRU may perform resource re-evaluation after random selection. The WTRU may determine whether to perform one resource (re-)evaluation for a randomly selected resource based on any one or more of the following criteria: resource pool configuration; the QoS of the TB; the CBR of the resource pool and/or CR of the WTRU; timing between the resource selection time and the first selected resource; HARQ type of the TB (e.g., HARQ enabled and HARQ disabled TB); DRX status of the WTRU; the power saving mode of the WTRU; and/or whether semi-persistent resource reservation is enabled/disabled in the resource pool.

In an example of resource pool configuration, the WTRU may be (pre-)configured whether to perform resource re-evaluation for a randomly selected resource in a resource pool or not. The WTRU may determine whether to perform resource (re-)evaluation for the selected resource accordingly. In an example of the QoS of the TB, the WTRU may determine to perform resource (re-)evaluation for a randomly selected resource if the QoS of the TB is larger than a threshold. Otherwise, the WTRU may determine not to perform resource (re-)evaluation. The threshold may be (pre-)configured per resource pool. In an example of the timing between the resource selection time and the first selected resource, the WTRU may determine to perform resource (re-)evaluation for a randomly selected resource if the time gap between the resource selection and the first selected resource is greater than a threshold. Otherwise, the WTRU may not perform resource (re-)evaluation for the randomly selected resource. The threshold may be (pre-)configured per resource pool. The threshold may be a function of the QoS of the TB. In an example of the DRX status of the WTRU, the WTRU may determine to perform resource (re-)evaluation for a randomly selected resource if the QoS of the TB is larger than a threshold. Otherwise, the WTRU may determine not to perform resource (re-)evaluation. The threshold may be (pre-)configured per resource pool. In an example of whether semi-persistent resource reservation is enabled/disabled in the resource pool, the WTRU may determine to perform resource (re-)evaluation for a randomly selected resource based on whether semi-persistent is enabled/disabled. For example, the WTRU may perform resource (re-) evaluation for a randomly selected resource if semi-persistent resource reservation is disabled. Otherwise, the WTRU may not perform resource (re-) evaluation for the randomly selected resource.

In an example, the WTRU may determine sensing a window for resource re-evaluation after random selection. The WTRU may determine the sensing window for resource (re-)evaluation of the randomly selected resource. In an example, the sensing window may be started from the time WTRU performing resource selection and it may finish T3 slots before the first randomly selected resource. T3 may be fixed based on the processing capability of the WTRU. In another example, the WTRU may be (pre-) configured a minimum sensing window for resource (re-)evaluation of the randomly selected resource. The WTRU may start performing sensing when it triggers resource selection and it may stop sensing when the minimum sensing window is reached. The WTRU may start sensing T0 slots before triggering resource selection. The WTRU may stop perform sensing for resource (re-)selection when the minimum required sensing window is reached and/or T3 slots before the first randomly selected resource.

Figure 11:
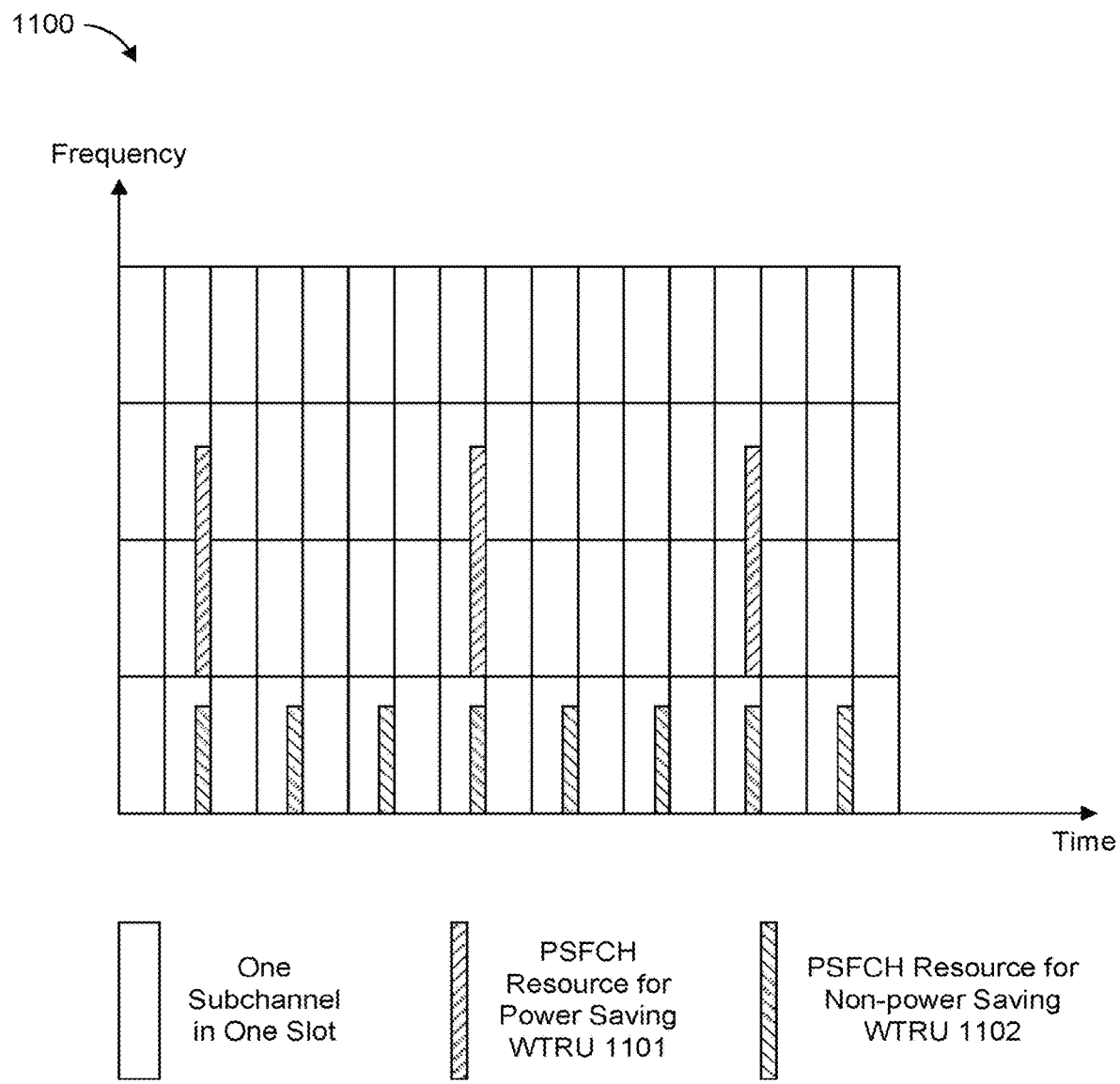
FIG. 11 shows a resource time of example time-frequency resources of physical sidelink feedback channel (PSFCH) resource sets for power saving WTRUs and resource sets for non-power saving WTRUs.

In an example, mechanisms may support unicast/groupcast. In an example, the WTRU may determine the resource for HARQ feedback. The WTRU may be configured one set of HARQ feedback resources for one resource selection mode, power saving mode, and/or type of WTRU and another set of HARQ feedback resources for another resource selection mode, power saving mode and/or type of WTRU. The resource selection mode, power saving mode, and/or type of WTRU may be indicated in the SCI. The receiving WTRU (the WTRU that receives the SCI) may then determine which HARQ feedback resource to use based on the resource selection mode, power saving mode, and/or type of WTRU indicated in the SCI (the WTRU that transmitted the SCI). FIG. 11 shows a resource time of example time-frequency resources 1100 of physical sidelink feedback channel (PSFCH) resource sets for power saving WTRUs 1101 (e.g., PUEs) and resource sets for non-power saving WTRUs 1102 (e.g., VUEs). In the example of FIG. 11, WTRUs may be configured two HARQ resource sets: the first resource set occurring every 2 slots may be used for non-power saving WTRUs 1102 (e.g., VUEs), and the second resource occurring every 6 slots may be used for power saving WTRUs 1101 (e.g., PUEs). This approach may facilitate the limited processing capability of a power saving WTRU (e.g., PUE).

In an example, the WTRU may determine whether to transmit the HARQ feedback for a PSCCH/PSSCH. A WTRU may determine whether to transmit the HARQ feedback to the Tx WTRU after each PSCCH/PSSCH reception based on one or more factors. An example determining factor may be the number of transmissions for a TB. For example, the WTRU may feedback HARQ after a certain number of transmissions of the TB. For example, the WTRU may transmit (report) HARQ feedback after at most X transmissions of a TB. The value of X may be (pre-)configured per resource pool based on QoS of the TB (e.g. priority). An example factor may be the resource reservation information in the SCI. For example, the WTRU may report HARQ feedback after one PSCCH/PSSCH transmission if the SCI reserves smaller than N resources for the same TB. The WTRU may not report HARQ feedback if the SCI reserves at least N resources for the same TB. An example factor may be the QoS of the TB. For example, the WTRU may determine whether to transmit a HARQ feedback for a PSCCH/PSSCH based on QoS of the TB. For example, the WTRU may transmit (report) HARQ feedback if the priority of the TB is greater than a threshold and may not report HARQ feedback if the priority of the TB is smaller than a threshold. An example factor may be the CBR of the resource pool. An example factor may be the resource selection mode for the transmission resources of the TB. For example, the WTRU may report HARQ feedback for a PSCCH/PSSCH transmission if the Tx WTRU performs random resource selection; otherwise, the WTRU may not perform HARQ feedback. In contrast, the receiving WTRU may perform HARQ feedback if the Tx WTRU performs sensing based resource allocation; otherwise, the WTRU may not perform HARQ feedback.

In an example, the WTRU may adapt the set of sensing resources based on HARQ feedback and/or the average number of transmissions per TB. In one approach, the WTRU may adapt the set of sensing resources based on the HARQ feedback status of a TB. For example, the WTRU may increase the number of resources for sensing if it receives more than X NACK feedbacks for one TB. The WTRU may then decrease the number of sensing resources if it receives less than Y NACK feedback for one TB. The value of X and Y may be configured per resource pool per priority.

In an example, the WTRU may adapt the set of sensing resources based on the average number of transmissions of the TB per priority. In one approach, the WTRU may adapt the set of sensing resources based on the average number of transmissions per TB. For example, the WTRU may increase the number of sensing resources if the average number of transmissions per TB is greater than a threshold and it may decrease the number of the sensing resources if the average number of transmissions per TB is smaller than a threshold. The threshold may be configured per resource pool per priority.

In an example, a WTRU may do any one or more of the following: determine whether to use sensing based or random resource selection in a resources pool; indicate resource selection mode and/or power saving mode in the message; determine the resource(s) selection window for a TB; determine the resource(s) selection for HARQ feedback; determine whether to transmit HARW feedback for a PSCCH/PSSCH; adapt a set of sensing resources based on HARQ feedback and/or an average number of transmissions per TB; and/or, adapt a set of sensing resources based on an average number of transmission of the TB per priority.

Example methods for congestion control are described herein. A WTRU may determine the transmission behavior of a TB for congestion control. In an example, the WTRU may determine any one or more of the following transmission parameters of a TB: the number of (re)transmissions for a TB; the number of sub-channels used for each transmission; transmission power; the MCS in one TB; and/or which MCS table to use.

Any one or more of the following criteria may be used by the WTRU to determine the transmission parameters of a TB. In an example, the resource selection type (e.g., random based, full sensing-based, and partial sensing-based) may be used. For example, the WTRU may be (pre-)configured to use multiple resource selection types for a TB. The WTRU may be (pre-)configured multiple set of ranges (e.g., maximum and/or minimum) of the transmission parameters of a TB, in which one set may be (pre-) configured for one (or more) resource selection types (e.g., random based, full sensing-based and partial sensing-based) and the other set may be (pre-)configured for another resource selection type. The WTRU may then determine which set of ranges to use based on the resource selection type of the TB.

For example, the WTRU may be (pre-)configured with two maximum numbers of (re-)transmissions per TB, one threshold may be (pre-)configured for random-based resource allocation and the other threshold may be (pre-) configured for sensing-based resource allocation. The WTRU may then determine which threshold to use based on the resource selection type of the TB.

In an example, the number of candidate slots and/or the number of candidate resources in the resource selection window may be used. For example, the WTRU may determine the maximum number of (re-)transmissions for a TB based on the maximum number of candidate slots in the resource selection window. In another example, the number of selectable resources in the resource selection window may be used. In another example, HARQ type of the TB (e.g., HARQ enabled and HARQ disabled TB) may be used.

In another example, DRX status of the WTRU may be used. For example, the DRX status of the WTRU may include any one or more of the following criteria: whether DRX is configured; and/or whether the WTRU is in on duration or off duration. In another example, whether resource (re-)evaluation of a selected resource is enabled/disabled may be used. In another example, whether resource (re-)evaluation of a reserved resource is enabled/disabled may be used. In other examples, cast type of the TB (e.g., broadcast, unicast, or groupcast) and/or the power saving mode of the WTRU may be used. In another example, the QoS of the TB, CBR of the resource pool, and/or CR of the WTRU may be used. For example, the WTRU may determine which MCS table to use based on QoS of the TB, CBR of the resource pool, and/or CR of the WTRU.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A wireless transmit/receive unit (WTRU), comprising:
a transceiver; and
a processor, wherein the transceiver and the processor are configured to:

receive, from a network node, information comprising duration information for a sensing window, wherein the sensing window includes a plurality of slots;
determine a duration of the sensing window in terms of number of slots based on the duration information and a characteristic of sidelink data transmissions from the WTRU;
perform sensing for the determined duration of the sensing window;
select, based on the performed sensing, resources on a sidelink for the sidelink data transmissions by the WTRU;
perform channel busy ratio (CBR) measurements on the sidelink in at least one of the plurality of slots of the sensing window; and
transmit sidelink data using the selected resources.

2. The WTRU of claim 1, wherein the characteristic of the sidelink data transmissions includes quality of service (QOS).

3. The WTRU of claim 1, wherein the characteristic of the sidelink data transmissions includes if the sidelink data transmissions are periodic or aperiodic.

4. The WTRU of claim 1, wherein the sensing is performed in response to traffic arriving at the WTRU for transmission.

5. The WTRU of claim 1, wherein the sensing is performed in response to the WTRU requesting resources for transmission.

6. The WTRU of claim 1, wherein the transmission of the sidelink data is based on the performed CBR measurements.

7. The WTRU of claim 1, wherein the transceiver and the processor are further configured to:
determine a value of modulation and coding scheme (MCS) based on the performed CBR measurements, wherein the transmission of the sidelink data uses the determined value of MCS.

8. A method performed by a wireless transmit/receive unit (WTRU), the method comprising:
receiving, from a network node, information comprising duration information for a sensing window, wherein the sensing window includes a plurality of slots;
determining a duration of the sensing window in terms of number of slots based on the duration information and a characteristic of sidelink data transmissions from the WTRU;
performing sensing for the determined duration of the sensing window;
selecting, based on the performed sensing, resources on a sidelink for the sidelink data transmissions by the WTRU;
performing channel busy ratio (CBR) measurements on the sidelink in at least one of the plurality of slots of the sensing window; and
transmitting sidelink data using the selected resources.

9. The method of claim 8, wherein the characteristic of the sidelink data transmissions includes quality of service (QOS).

10. The method of claim 8, wherein the characteristic of the sidelink data transmissions includes if the sidelink data transmissions are periodic or aperiodic.

11. The method of claim 8, wherein the sensing is performed in response to traffic arriving at the WTRU for transmission.

12. The method of claim 8, wherein the sensing is performed in response to the WTRU requesting resources for transmission.

13. The method of claim 8, wherein the transmission of the sidelink data is based on the performed CBR measurements.

14. The method of claim 8, further comprising:
determining a value of modulation and coding scheme (MCS) based on the performed CBR measurements, wherein the transmission of the sidelink data uses the determined value of MCS.

* * * * *